United States Patent
Itoh et al.

(10) Patent No.: US 10,577,189 B2
(45) Date of Patent: Mar. 3, 2020

(54) CONVEYANCE DEVICE, PLANAR CONVEYANCE APPARATUS, AND CONVEYANCE UNIT

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Kazuwo Miki, Himeji (JP)

(73) Assignee: ITOH DENKI CO., LTD. (JP)

(*) Notice: Subject to any disclaimer, the term of this patent is extended or adjusted under 35 U.S.C. 154(b) by 0 days.

(21) Appl. No.: 15/573,538

(22) PCT Filed: Jun. 24, 2016

(86) PCT No.: PCT/JP2016/068872
§ 371 (c)(1),
(2) Date: Nov. 13, 2017

(87) PCT Pub. No.: WO2016/208736
PCT Pub. Date: Dec. 29, 2016

(65) Prior Publication Data
US 2018/0111767 A1 Apr. 26, 2018

(30) Foreign Application Priority Data

Jun. 25, 2015 (JP) .................. 2015-128109
Apr. 11, 2016 (JP) .................. 2016-079176

(51) Int. Cl.
| | |
|---|---|
| B65G 47/244 | (2006.01) |
| B65G 15/22 | (2006.01) |
| B65G 21/14 | (2006.01) |
| B65G 23/10 | (2006.01) |
| B65G 13/10 | (2006.01) |

(Continued)

(52) U.S. Cl.
CPC ......... B65G 47/2445 (2013.01); B65G 13/10 (2013.01); B65G 15/22 (2013.01);

(Continued)

(58) Field of Classification Search
CPC ........ B65G 13/10; B65G 15/22; B65G 21/14; B65G 23/10; B65G 23/22; B65G 23/24;
(Continued)

(56) References Cited

U.S. PATENT DOCUMENTS 3,912,071 A * 10/1975 Nielson
4,494,656 A * 1/1985 Shay
(Continued)

FOREIGN PATENT DOCUMENTS

| EP | 1 947 035 A1 | 7/2008 |
|---|---|---|
| JP | 48-098580 A | 12/1973 |

(Continued)

OTHER PUBLICATIONS

International Search Report, dated Aug. 9, 2016 in International Application No. PCT/JP2016/068872.
(Continued)

*Primary Examiner* — Gene O Crawford
*Assistant Examiner* — Keith R Campbell
(74) *Attorney, Agent, or Firm* — Wood, Phillips, Katz, Clark & Mortimer

(57) ABSTRACT

A conveyance device capable of performing traveling operation and turning operation, a planar conveyance apparatus, and a conveyance unit. A conveyance device 1 has a travel part 5 having a belt 2 for allowing an article to be placed, and a turning table 6 that supports the travel part 5. The belt 2 is an endless member suspended between a pair of rollers 3. The belt 2 travels by being engaged with a driving body 4 to which power of a motor for traveling 9 is transmitted by a drive shaft 14. Power of a motor for turning 8 is transmitted to the turning table 6, so that the turning table 6 turns. That is, when the motor for turning 8 is driven, the travel part 5 turns along with the turning table 6.

33 Claims, 34 Drawing Sheets

(51) Int. Cl.
*B65G 23/22* (2006.01)
*B65G 23/24* (2006.01)
*B65G 43/08* (2006.01)

(52) U.S. Cl.
CPC .............. *B65G 21/14* (2013.01); *B65G 23/10* (2013.01); *B65G 23/22* (2013.01); *B65G 23/24* (2013.01); *B65G 47/244* (2013.01); *B65G 43/08* (2013.01)

(58) Field of Classification Search
CPC ...... B65G 23/28; B65G 43/08; B65G 47/244; B65G 47/2445; B65G 47/53; B65G 47/54; B65G 2207/30
See application file for complete search history.

(56) References Cited

U.S. PATENT DOCUMENTS

| | | | |
|---|---|---|---|
| 5,029,693 A * | 7/1991 | Williams | |
| 6,889,815 B2 * | 5/2005 | Kanamori | |
| 2003/0234155 A1 | 12/2003 | Kanamori et al. | |

FOREIGN PATENT DOCUMENTS

| | | | |
|---|---|---|---|
| JP | 59-184808 A | | 10/1984 |
| JP | 3516343 B1 | | 1/2004 |
| JP | 2004-075387 A | | 3/2004 |
| JP | 2007-269477 A | | 10/2007 |
| JP | 2008 074505 A | | 4/2008 |
| JP | 2009-137687 A | | 6/2009 |
| JP | 2009137687 A | * | 6/2009 |
| JP | 2014-159329 A | | 9/2014 |
| JP | 2014159329 A | * | 9/2014 |
| WO | 2014/152512 A1 | | 9/2014 |

OTHER PUBLICATIONS

International Preliminary Report on Patentability and Written Opinion, dated Dec. 26, 2017, in Application No. PCT/JP2016/068872.
Supplementary Partial European Search Report, dated Jul. 24, 2019 in European Patent Application No. EP 16 81 4505.

* cited by examiner

CONVEYANCE DEVICE, PLANAR CONVEYANCE APPARATUS, AND CONVEYANCE UNIT

TECHNICAL FIELD

The present invention relates to a conveyance device that conveys an article. Additionally, the present invention relates to a planar conveyance apparatus in which the conveyance devices are planarly disposed, and a conveyance unit in which a plurality of the conveyance devices are unitized.

BACKGROUND ART

A planar conveyance apparatus in which a large number of small-sized conveyance cells (conveyance devices) are disposed planarly is disclosed in Patent Document 1. In the planar conveyance apparatus described in Patent Document 1, each conveyance cell has a short roller for placing an article, and the short rollers travel. Each conveyance cell has a turning mechanism, and each short roller turns to enable change in the moving direction of an article.

According to the planar conveyance apparatus of Patent Document, it is possible to introduce an article from a plurality of directions, and it is also possible to discharge the article in a plurality of directions.

PRIOR ART DOCUMENTS

Patent Documents

Patent Document 1: JP 3516343 B

DISCLOSURE OF INVENTION

Technical Problem

While the planar conveyance apparatus disclosed in Patent Document 1 is an apparatus in which the small-sized conveyance cells (conveyance devices) are planarly disposed as described above, a configuration in which each conveyance cell in a certain area is turned to the same direction is assumed.

That is, in the planar conveyance apparatus disclosed Patent Document 1, the conveyance cells are disposed in 6 rows and 9 columns. For example, a conveying surface is divided into a division of 4 rows and 6 columns and a division of 2 rows and 6 columns, and the turning mechanisms of the conveyance cells belonging to the respective divisions interlock with each other. Therefore, the short rollers of the conveyance cells belonging to each division rotate synchronously.

In the planar conveyance apparatus disclosed in Patent Document 1, the turning mechanisms of the conveyance cells belonging to the respective divisions are connected in series by a series of spur gear trains.

In the planar conveyance apparatus disclosed in Patent Document 1, the short rollers of the conveyance cells belonging to the respective divisions receive power from a horizontally disposed shaft.

In the planar conveyance apparatus disclosed in Patent Document 1, a large number of conveyance cells are included in one area, and the large number of conveyance cells included in the one area are suitable for application of synchronous traveling/turning.

However, the planar conveyance apparatus disclosed in Patent Document 1 is unsuitable for application of causing the conveyance cells to travel and turn one by one, and application of causing a small number of conveyance cell such as about four conveyance cells to travel and turn as one division.

The above problems of the conventional technology are noticed, and an object of the present invention is to develop a conveyance device (conveyance cell) suitable for application of causing the conveyance cells to travel and turn one by one, and application of causing a small number of conveyance cell such as about four conveyance cells to travel and turn as one division.

Additionally, an object of the present invention is to develop a planar conveyance apparatus enabling traveling and turning of conveyance cells one by one, and enabling traveling and turning of a small number of conveyance cell such as about four conveyance cells as one division.

Furthermore, an object is to develop a conveyance unit obtained by unitizing these conveyance devices or planar conveyance apparatuses.

Solution to Problem

A first aspect of the present invention for solving the above problem is a conveyance device including: a travel part moving an article and having a contact member, the contact member coming into contact with the article to rotate or travel; a turning table supporting the travel part; a motor for turning including a through hole axially passing through the motor for turning and an output part outputting turning force; a motor for traveling disposed below the motor for turning; and a drive shaft inserted into the through hole, wherein the motor for traveling rotates the drive shaft, the drive shaft driving the travel part, and wherein the turning table is directly or indirectly engaged with the output part of the motor for turning, the motor for turning turning the turning table and the travel part.

The conveyance device of this aspect is suitable as a conveyance cell of a planar conveyance apparatus.

In the conveyance device of this aspect, the travel part can convey the article, and further can turn the travel part, and therefore the conveying direction can be easily changed.

Additionally, the drive shaft is inserted into the through hole of the motor for turning, and therefore it is possible to achieve space saving of the conveyance device.

According to this aspect, the motor for traveling is disposed below the motor for turning, and the motor for traveling rotates the drive shaft, and therefore layout when the conveyance devices is incorporated in the planar conveyance apparatus is simplified, and space saving can be achieved.

Another aspect is a conveyance device including: a travel part moving an article and having a contact member, the contact member coming into contact with the article to rotate or travel; a turning table supporting the travel part; a first engaging member; a motor for traveling; a drive shaft transmitting power to the travel part; and a second engaging member mounted on the drive shaft, the second engaging member rotating integrally with the drive shaft, wherein the motor for traveling rotates the drive shaft, the drive shaft driving the travel part, and wherein the second engaging member is capable of driving a travel part of another conveyance device whereas the first engaging member receives power transmission from outside to turn the turning table and the travel part.

The conveyance device of this aspect can drive the travel part of another conveyance device, and the number of power sources such as a motor can be reduced.

Another aspect is a conveyance device including: a travel part moving an article and having a contact member, the contact member coining into contact with the article to rotate or travel; a turning table supporting the travel part; a first engaging member having a through hole axially passing therethrough; and a drive shaft transmitting power to the travel part, the drive shaft having a third engaging member, wherein the drive shaft is inserted into the through hole, wherein the third engaging member receives power transmission from another conveyance device to rotate, and wherein the first engaging member receives power transmission from outside to turn the turning table and the travel part.

The conveyance device of this aspect receives power transmission from another conveyance device or the like to operate, and therefore the number of power sources such as a motor can be reduced.

In the preferable aspect, the contact member is an endless member, the travel part includes: a pair of rotators freely rotating; the endless member suspended between the rotators; and a driving body receiving power of the drive shaft to rotate, and the driving body is engaged with the endless member between the rotators to cause the endless member to travel.

Another aspect is a conveyance device including: a travel part moving an article and having a contact member, the contact member coming into contact with the article to rotate or travel; a turning table turning while supporting the travel part; and a drive shaft, wherein the contact member is an endless member, wherein the travel part includes: a pair of rotators freely rotating, the endless member suspended between the rotators; and a driving body receiving power of the drive shaft to rotate, and wherein the driving body is engaged with the endless member between the rotators to cause the endless member to travel.

According to this configuration, the article comes into contact with the endless member suspended between the pair of rotators that freely rotate and is conveyed, and therefore the article and the endless member come into face contact with each other. Additionally, the endless member travels, so that the article is conveyed, and therefore the article and the endless member are unlikely to be rubbed with each other, and it is possible to prevent abrasion or damage of the article or the endless member.

The driving body is engaged with the part between the rotators in the endless member to cause the endless member to travel, and therefore the driving body does not come into contact with the article. Therefore, it is possible to prevent abrasion or damage of the article by contact with the driving body.

The conveyance device desirably has an engaging part engaged with another conveyance device, wherein the each engaging part of a plurality of the conveyance devices are engaged with each other to allow planar connection of the plurality of the conveyance devices.

According to this aspect, the plurality of conveyance devices are connected, so that a planar conveyance apparatus can be configured.

Another aspect is a conveyance device including: a travel part moving an article and having a contact member, the contact member coming into contact with the article to rotate or travel; a turning table supporting the travel part; a motor for turning that turns the turning table and the travel part; and a motor for traveling that drives the travel part, wherein the turning table is directly or indirectly engaged with an output part of the motor for turning.

The motor for turning and the motor for traveling are desirably located at overlapped positions.

In the above aspect, the conveyance device desirably includes a drive shaft, wherein the motor for turning or the motor for traveling disposed on an upper side has a through hole axially passing therethrough, and wherein the drive shaft is engaged with the motor disposed on a lower side, the drive shaft being inserted into the through hole to drive the travel part or the turning table.

Another aspect is a conveyance device including: a travel part moving an article and having a contact member, the contact member coming into contact with the article to rotate or travel; a turning table that supports the travel part; a motor for turning; a motor for traveling; and a drive shaft, wherein the motor for turning or the motor for traveling disposed on an upper side has a through hole axially passing therethrough, and wherein the drive shaft is engaged with the motor disposed on a lower side, the drive shaft being inserted into the through hole to drive the travel part or the turning table.

In each of the above aspects, the motor for turning and the motor for traveling are desirably disposed on the same axial line.

In each of the above aspects, the conveyance device desirably includes a speed reduction mechanism decelerating rotation of the motor for turning to drive the turning table.

The motor for turning desirably has an enclosure member including a rotor, a stator, the speed reduction mechanism, and an internal gear therein, the speed reduction mechanism being a planet gear train having the internal gear as one of components.

In a configuration of the planar conveyance apparatus, a plurality of the conveyance devices described above are disposed planarly.

A planar conveyance apparatus of a preferable aspect is a planar conveyance apparatus including: one or more main conveyance devices each composed of the conveyance device according to any one of above conveyance devices; and one or more auxiliary conveyance devices each including a travel part moving an article and having a contact member, the contact member coming into contact with the article to rotate or travel; and a turning table supporting the travel part, wherein the travel part and/or the turning table of any of the auxiliary conveyance devices moves in synchronization with the travel part and/or the turning table of any of the main conveyance devices.

Herein, the "main conveyance device" and the "auxiliary conveyance device" are merely terms into which names are changed in order to facilitate understanding of the invention, and a conveyance device having a similar function to the "main conveyance device" may be used as the "auxiliary conveyance device".

A planar conveyance apparatus of another preferable aspect is a planar conveyance apparatus including: one or more main conveyance devices each composed of the conveyance device according to any one of any of the above conveyance devices; and one or more auxiliary conveyance devices, wherein the main conveyance device includes: a motor for turning; and a fourth engaging member connected to or engaged with an output part of the motor for turning, wherein the auxiliary conveyance device includes: a travel part moving an article and having a contact member, the contact member coming into contact with the article to rotate or travel; a turning table supporting the travel part; and a first engaging member having a through hole axially passing therethrough, wherein the first engaging member is directly or indirectly engaged with the fourth engaging member to rotate with rotation of the fourth engaging member, wherein a drive shaft is inserted into the through hole to drive the travel part, and wherein the first engaging member turns the turning table and the travel part.

According to this configuration, it is possible to share a plurality of the motors for turning. That is, the number of the motors for turning can be reduced with respect to the number of the travel parts.

At least one of the main conveyance devices or the auxiliary conveyance devices desirably has a motor for traveling below the first engaging member, and the motor for traveling desirably rotates the drive shaft of the main conveyance device or the auxiliary conveyance device, and a drive shaft of another of the main conveyance devices or the auxiliary conveyance devices.

According to this configuration, it is possible to share a plurality of the motors for traveling. That is, the number of the motors for traveling can be reduced with respect to the number of the travel parts.

A planar conveyance apparatus of another preferable aspect is a planar conveyance apparatus including: one or more main conveyance devices each composed of the conveyance device according to any one of claims 1 to 6, and claims 9 to 13; and one or more auxiliary conveyance devices, wherein the auxiliary conveyance device includes: a travel part moving an article and having a contact member, the contact member coming into contact with the article to rotate or travel; a turning table supporting the travel part; and a first engaging member receiving power transmission from outside to rotate, wherein the main conveyance device or the auxiliary conveyance device includes a motor for traveling, wherein the main conveyance device or the auxiliary conveyance device including the motor for traveling has a second engaging member connected to or engaged with an output part of the motor for traveling, wherein the main conveyance device or the auxiliary conveyance device not including the motor for traveling has a third engaging member, wherein the third engaging member is directly or indirectly engaged with the second engaging member to rotate with rotation of the second engaging member, and wherein the third engaging member rotates a drive shaft.

According to this configuration, it is possible to share a plurality of the motors for traveling and a plurality of the motors for turning. That is, the number of the motors for traveling and the number of the motors for turning can be reduced with respect to the number of the travel parts.

Another aspect of the present invention is a planar conveyance apparatus including: a plurality of travel parts disposed planarly; and a drive shaft disposed below each of the travel parts, wherein each of the travel parts includes: a pair of rotators freely rotating; an endless member suspended between the rotators; and a driving body receiving power of the drive shaft to rotate, the driving body being engaged with the endless member between the rotators.

According to this configuration, the endless member suspended between the pair of rotators can convey the article without bringing the article into contact with the driving body. That is, in the endless member, there are an upper part on which the article is placed, and a lower part with which the driving body is engaged. Therefore, the endless member can be caused to travel by the driving body, and can convey the article.

The article can be conveyed while being placed on the endless member, and the endless member and the article are unlikely to be rubbed with each other. Therefore, it is possible to prevent abrasion or damage of the article during conveyance.

A preferable aspect as the conveyance unit is a conveyance unit including: a main conveyance device composed of the conveyance device according to any one of the above conveyance devices; and one or more auxiliary conveyance devices, wherein the main conveyance device, and each of the one or more auxiliary conveyance devices are each defined as one conveyance cell, and 3 or more of the conveyance cells are planarly or linearly disposed, wherein the main conveyance device includes: a motor for turning; and a fourth engaging member connected to an output part of the motor for turning, wherein the auxiliary conveyance device includes: a travel part moving an article and having a contact member, the contact member coming into contact with the article to rotate or travel; a turning table supporting the travel part; and a first engaging member having a through hole axially passing there through, wherein the first engaging member is directly or indirectly engaged with the fourth engaging member to rotate with rotation of the fourth engaging member, wherein a drive shaft is inserted into the through hole to drive the travel part, and wherein the first engaging member turns the turning table and the travel part.

An aspect of another conveyance unit is a conveyance unit including: three or more conveyance cells planarly or linearly disposed; a fifth engaging member; a sixth engaging member; a motor for turning; and a motor for traveling, wherein each of the conveyance cells includes: a travel part moving an article and having a contact member, the contact member coming into contact with the article to rotate or travel; a turning table supporting the travel part; and a drive shaft transmitting power to the travel part, wherein two or more of the conveyance cells each have a first engaging member, wherein each of the drive shafts belonging to two or more of the conveyance cells has a third engaging member, wherein the fifth engaging member and the sixth engaging member are located at such positions not to be overlapped with each other in a height direction, wherein the fifth engaging member receive power transmission from the motor for turning to rotate whereas the sixth engaging member receives power transmission from the motor for traveling to rotate, wherein the first engaging member is directly or indirectly engaged with the fifth engaging member, allowing to rotate with rotation of the fifth engaging member to turn the turning table and the travel part, and wherein the third engaging member of each of the drive shafts is directly or indirectly engaged with the sixth engaging member, allowing to rotate with rotation of the sixth engaging member to drive the travel part.

The three or more conveyance cells are desirably disposed such that a planar view shape of lines connecting centers of the three or more conveyance cells is a polygonal shape, and centers of the fifth engaging member and the sixth engaging member are located inside the polygonal shape.

In the conveyance unit, a small number of the conveyance cells synchronously travel and turn. Additionally, the single motor for turning can turn the travel part of each conveyance cell.

Furthermore, in the conveyance unit, the single motor for traveling can drive the travel part of each conveyance cell.

As the conveyance cell of the above conveyance unit, the conveyance device of the above aspect can be used. That is, the conveyance device of the above aspect is used as the main conveyance device, the main conveyance device has the fourth engaging member connected to the output part of the motor for turning, and the fifth engaging member is engaged with the fourth engaging member.

In the planar conveyance apparatus, in a ease where a plurality of objects to be conveyed are put in the planar conveyance apparatus in an overlapped massive state, the travel parts and the turning tables are desirably driven, and the objects to be conveyed forming a mass are capable of being moved in such a direction as to be spread in four directions.

The planar conveyance apparatus can desirably include an information acquiring means for acquiring information from an object to be conveyed.

The conveyance device or the planar conveyance apparatus can desirably include a sensor that detects an article, wherein a detection part of the sensor is desirably a solar cell.

Effect of Invention

In the conveyance device of the present invention, the travel part can convey an article, and further can turn, and therefore it is possible to easily change the conveying direction. Additionally, it is possible to achieve space saving of the conveyance device.

When the conveyance devices of the present invention are incorporated in the planar conveyance apparatus, the conveyance cells can travel one by one, or a small number of conveyance cells such as four conveyance cells can travel or turn as one division.

When the conveyance units of the present invention are incorporated in the planar conveyance apparatus, a small number of conveyance cells such as four conveyance cells can travel or turn as one division.

The planar conveyance apparatus of the present invention can convey an article in a state where the article is placed on the endless member, the endless member and the article are unlikely to be rubbed with each other. Therefore, it is possible to prevent abrasion or damage of the article during conveyance.

In the conveyance unit of the present invention, a plurality of the conveyance cells and the travel parts can be turned by the single motor for turning, and furthermore the travel parts of a plurality of the conveyance cells can be caused to travel by the single motor for traveling.

BEST MODE FOR CARRYING OUT THE INVENTION

Hereinafter, description will be made with reference to the drawings.

Figure 1:
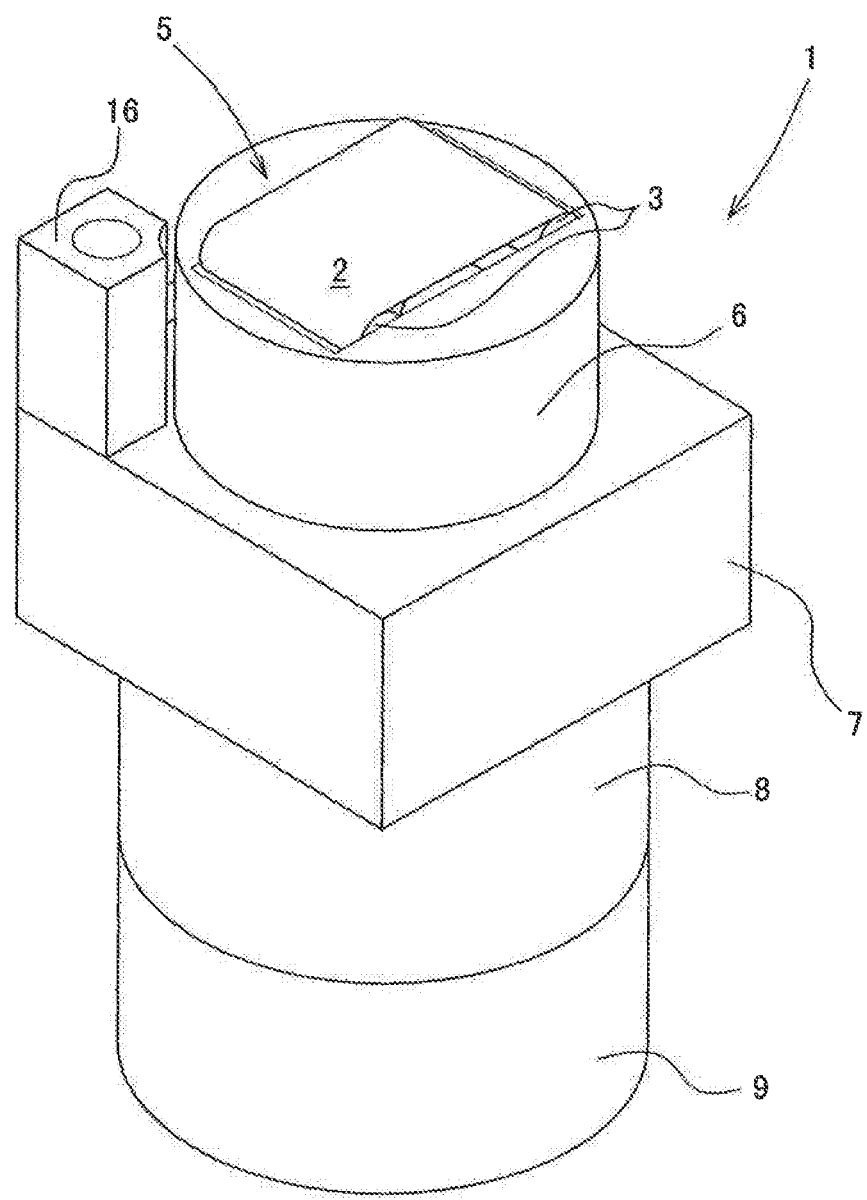
FIG. 1 is a perspective view of a conveyance device according to an embodiment of the present invention.
Figure 8:
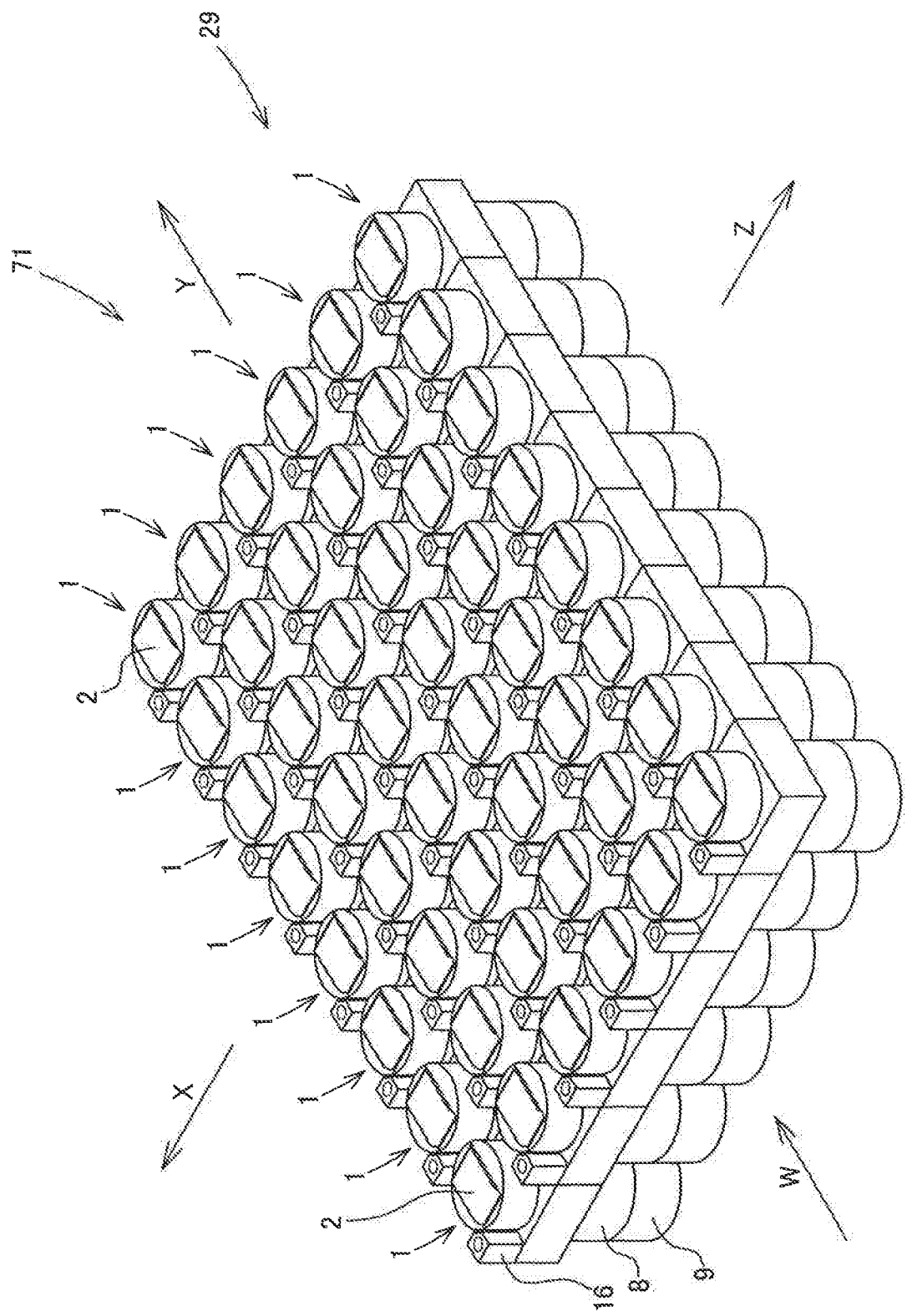
FIG. 8 is a perspective view of a planar conveyance apparatus configured by vertically and horizontally disposing a large number of the conveyance devices of FIG. 1.

A conveyance device 1 illustrated in FIG. 1 is a component of a planar conveyance apparatus 71 in FIG. 8. That is, the conveyance device 1 composes one conveyance cell of the planar conveyance apparatus 71.

Figure 2:
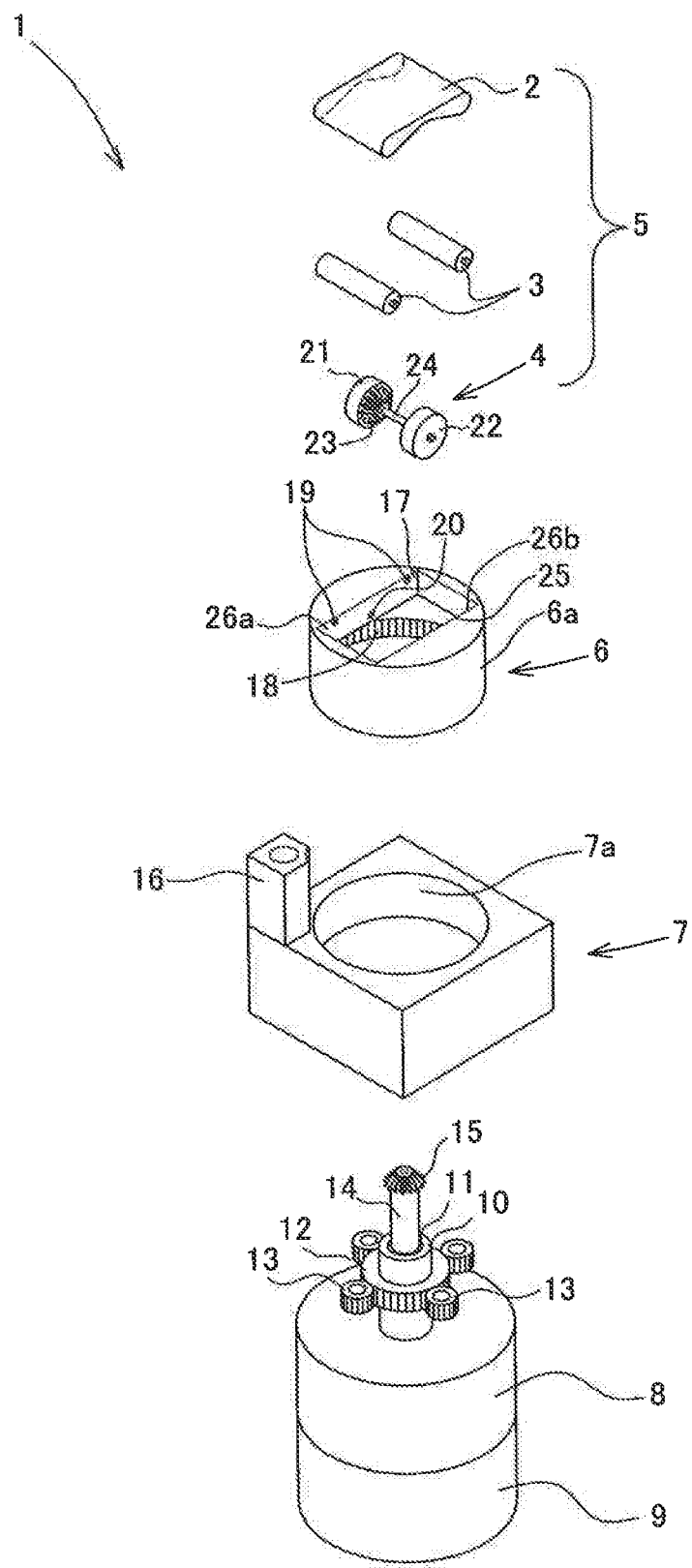
FIG. 2 is an exploded perspective view of the conveyance device in FIG. 1.

As illustrated in FIG. 1 and FIG. 2, the conveyance device (conveyance cell) 1 has a travel part 5, a turning table 6, a housing 7, a motor for turning 8, a motor for traveling 9, and the like from a top.

The housing 7 is fixed to a fixing structure (not illustrated) of the planar conveyance apparatus 71.

The motor for turning 8 is fixed to the housing 7. Additionally, the motor for traveling 9 is fixed under the motor for turning 8.

The travel part 5 is mounted on the turning table 6.

The turning table 6 is rotatably mounted on the motor for turning 8.

The travel part 5 is engaged with the motor for traveling 9.

First, respective configurations of these will be described, and then operation of the conveyance device 1 will be described.

The travel part 5 has a belt 2 (contact member, endless member), two rollers 3 (rotators), and a driving roller 4 (driving body), as illustrated in FIG. 2.

As illustrated in, FIG. 1 and FIG. 2, the belt 2 is wide belt-like, and has an annular (endless) structure. The two rollers 3 are disposed in an annular inner part of the belt 2.

The two rollers 3 are rotatably supported by the turning table 6 described below. The axes of the two rollers 3 are parallel. The two rollers 3 are disposed at a predetermined interval, and the belt 2 is suspended between the two rollers. The upper side (travel side) of the belt 2 is a conveying surface on which an article (object to be conveyed) is placed (contacted).

The driving roller 4 is disposed near a center below the belt 2. As illustrated in FIG. 2, the driving roller 4 has pressing parts 21, 22, a bevel gear part (bevel gear) 23, and a shaft part 24.

The pressing parts 21, 22 each are a part having a columnar shape with a circumferential surface.

The pressing parts 21, 22 are disposed at a predetermined interval.

In a portion facing the pressing part 22 in the pressing part 21, the bevel gear part 23 is provided. The pressing part 21 and the bevel gear part 23 are integrated, and are coupled to the pressing part 22 through the shaft part 24. An end of the shall part 24 passes through the pressing part 21 and the bevel gear part 23, and protrudes to the outside of the pressing part 21. Similarly, the other end of the shaft part 24 passes through the pressing part 22, and protrudes to the outside of the pressing part 22. The pressing part 21, the bevel gear part 23, the pressing part 22, and the shaft part 24 are integrally fixed to each other to integrally rotate.

In the driving roller 4, the pressing part 21 (bevel gear part 23) and the pressing part 22, having a relatively large diameter, are coupled by the shaft part 24 having a relatively small diameter, and therefore has a structure in which a central part of the driving roller 4 is pinched in.

The both ends of the shaft part 24 of the driving roller 4 is rotatably supported by the turning table 6 described below.

Figure 5:
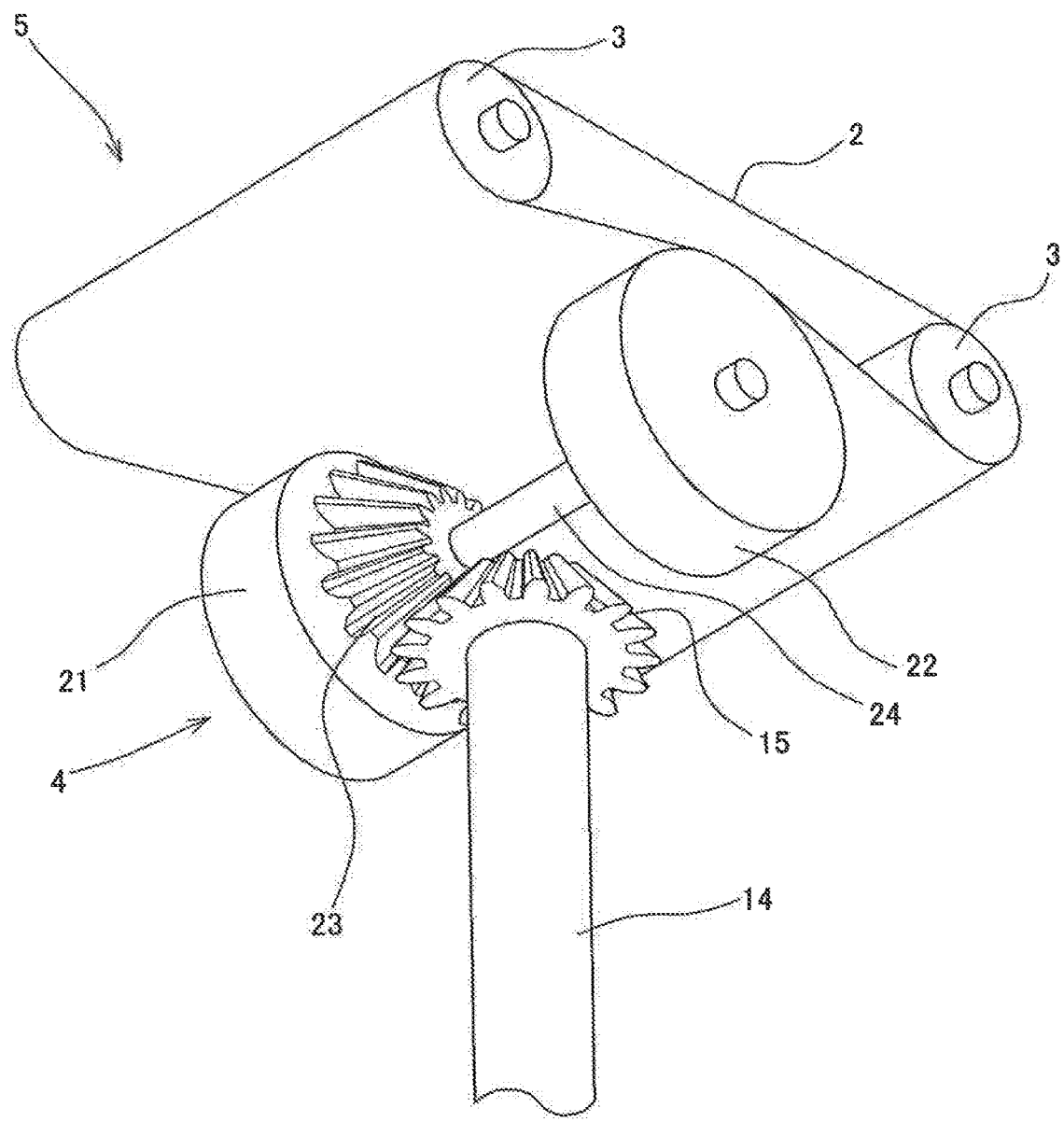
FIG. 5 is a partial perspective view of a belt drive part in the conveyance device in FIG. 1 as viewed obliquely from below.

As illustrated in FIG. 5, respective circumferential parts of the pressing parts 21, 22 of the driving roller 4 press the lower side (return side) of the belt 2.

That is, as a result of pressing the lower side of the belt 2 by the driving roller 4, the belt 2 are in close contact with the driving roller 4 and the two rollers 3, and tension is applied to the whole of the belt 2. When the driving roller 4 rotates, the annular belt 2 travels. When the belt 2 travels, the two rollers 3 rotate. Therefore, traveling of the belt 2 is smooth.

The turning table 6 is a cylindrical member having a circumferential surface, as illustrated in FIG. 2. Inside the turning table 6, a fixing part 17, and an engaging part 18 are provided. The fixing part 17 and the engaging part 18 are vertically disposed, and the fixing part 17 is disposed on the upper side of the engaging part 18. On an upper surface of the turning table 6, a quadrangular opening 25 is formed.

The fixing part 17 has a pair of facing wall surfaces 26a, 26b continued to the opening 25.

On the wall surface 26a, a driving roller fixing part 20, and two roller fixing parts 19 are provided. The driving roller fixing part 20, and the two roller fixing parts 19 are composed of known bearings.

The two roller fixing parts 19 are provided at a predetermined interval. The driving roller fixing part 20 is provided around an intermediate portion of the two roller fixing parts 19. Additionally, the driving roller fixing part 20 is provided below the roller fixing parts 19.

Although not illustrated for convenience for illustration, a driving roller fixing part 20 and two roller fixing parts 19 similar to the driving roller fixing part 20 and the two roller fixing parts 19 provided on the wall surface 26a are provided also on the wall surface 26b.

Shafts of the rollers 3 of the travel part 5 are rotatably mounted in the respective roller fixing parts 19 of the wall surfaces 26a, 26b. Additionally, the driving roller 4 (shaft part 24) is rotatably mounted in the respective driving roller fixing part 20 of the wall surfaces 26a, 26b. That is, the rollers 3 and the driving roller 4 of the travel part 5 are rotatably supported by the fixing part 17.

Figure 4:
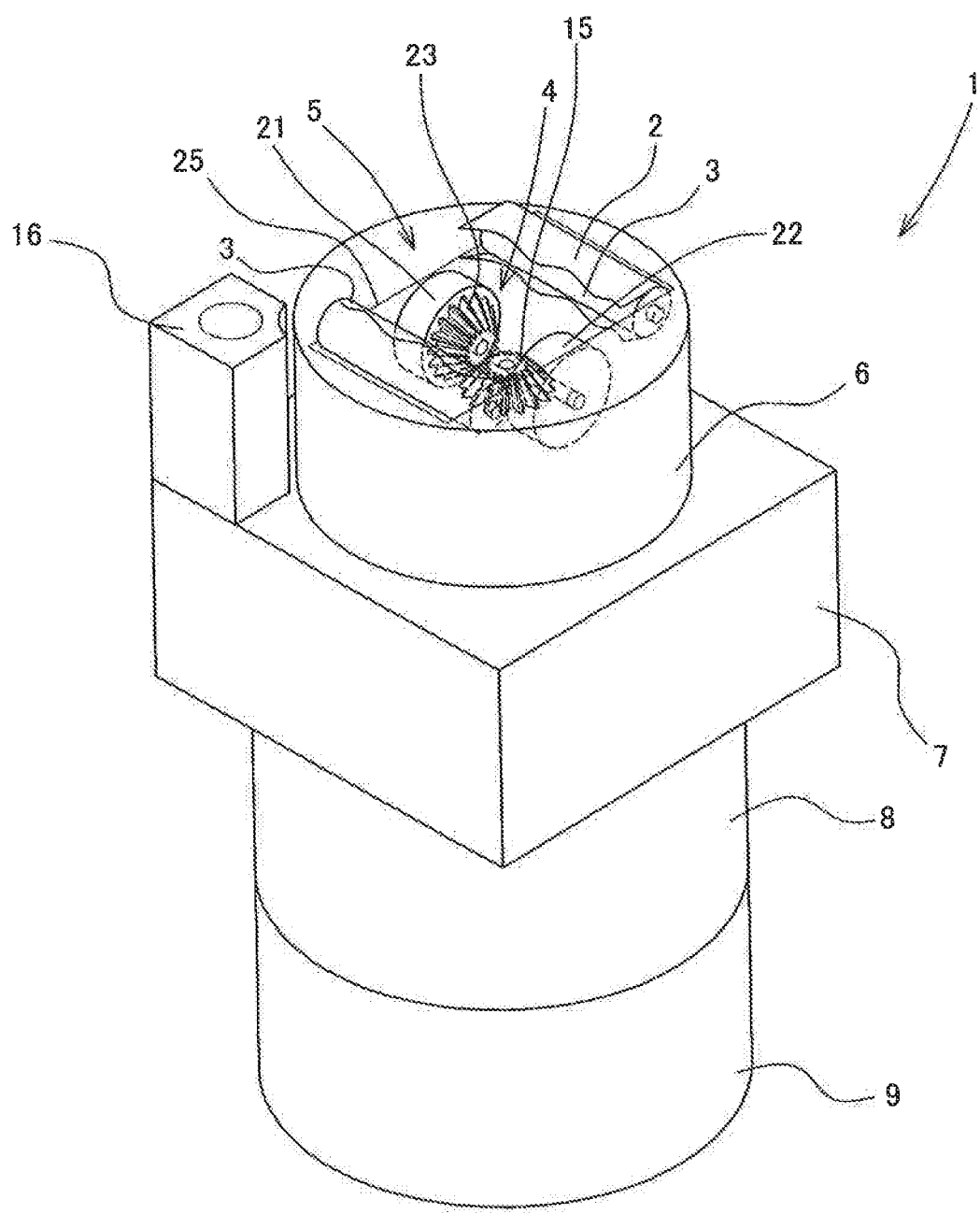
FIG. 4 is a perspective view of the conveyance device with a belt partially broken for illustration, in FIG. 1.

When the rollers 3 are mounted on the fixing part 17 of the turning table 6, one part of each roller 3 is exposed from the opening 25 as illustrated in FIG. 1 and FIG. 4. That is, the one part of an upper part of each roller 3 is exposed from the opening 25, and other part is housed in the turning table 6. Accordingly, the upper side (conveying surface side) of the belt 2 suspended between the rollers 3 is disposed above the opening 25.

As illustrated in FIG. 2, the engaging part 18 disposed below the fixing part 17 forms an annularly continued internal gear.

As illustrated in FIG. 2, the housing 7 has a quadrangular prism outer shape. A disposing hole for a motor for turning 7a that vertically passes through the housing 7 is provided in the housing 7. A below-described motor for turning 8 is housed and disposed in the disposing hole for a motor for turning 7a.

On an upper surface of the housing 7, a sensor 16 is provided. The sensor 16 has a function of detecting existence or passing of an article. Additionally, the sensor 16 may be capable of reading conveyance destination information. A height position of an upper end of the sensor 16 is slightly lower than an upper part (conveying surface) of the belt 2. Although each figure illustrates only one sensor 16, the sensors 16 are preferably provided at four places around the disposing hole for a motor for turning 7a.

A fixing structure (not illustrated) is fixed to the housing 7. As a result of fixing the housing 7 to the fixing structure, the posture of the conveyance device 1 is stabilized.

The motor for turning 8 (FIG. 3) has a stator 72 and a rotor 27 (FIG. 6, FIG. 7) similar to a known motor, and an output shaft 10 is connected to the rotor 27. The rotor 27 of the motor for turning 8 is cylindrical, and is formed with a through hole 73 therein.

A through hole 11 is provided inside the output shaft 10. The through hole 73 provided in the rotor 27, and the through hole 11 provided in the output shaft 10 are communicated with each other. Therefore, the motor for turning 8 has the through hole 11 that axially passes through the motor for turning.

The output gear 12 is integrally fixed to the outside of the output shaft 10. That is, the output gear 12 rotates integrally with the output shaft 10. Around the output gear 12, a plurality of (for example, four) small gears 13 are disposed around the output gear 12 at equal intervals. A shaft of each of the small gears 13 is rotatably supported by a coupling member (not illustrated). The coupling member is fixed to the housing 7 by a fixing member (not illustrated), and each small gear 13 does not revolve.

The respective small gears 13 are engaged with the engaging part 18 (internal teeth) illustrated in FIG. 2 of the turning table 6. Accordingly, power of the motor for turning 8 is transmitted to the engaging part 18 on the turning table 6 side through the output shaft 10, the output gear 12, and the plurality of small gears 13.

The small gears 13 can be omitted. That is, the output gear 12, and the engaging part 18 of the turning table 6 may be directly engaged with each other.

The motor for traveling 9 (FIG. 3) has a stator 75, and a rotor 28 (FIG. 6, FIG. 7) similar to a known motor. A drive shaft 14 (drive shaft) that is an output shaft is connected to the rotor 28. A bevel gear part 15 is provided in a tip of the drive shaft 14, and the bevel gear part 15 rotates integrally with the drive shaft 14. The outer diameter of the drive shaft 14 is smaller than the inner diameter of the through hole 11 of the output shaft 10 of the motor for turning 8 and the through hole 73 of the stator 72. The drive shaft 14 of the motor for traveling 9 passes through the through holes 73, 11 of the motor for turning 8, as illustrated in FIG. 2. The drive shaft 14 of the motor for traveling 9 and the output shaft 10 of the motor for turning 8 are concentric with each other.

The bevel gear part 15 is engaged with the bevel gear part 23 of the driving roller 4 of the travel part 5. That is, power of the rotor 28 of the motor for traveling 9 is transmitted to the bevel gear part 23 in the travel part 5 side through the drive shaft 14, and the bevel gear part 15, The conveyance device 1 includes a control device (not illustrated). The control device has a function of setting a rotation position of the turning table 6 based on a detection signal sent from the sensor 16 (FIG. 1), and controlling operation of the motor for turning 8 and the motor for traveling 9.

Now, operation of the conveyance device 1 will be described.

As illustrated in FIG. 8, a large number of the conveyance devices 1 are disposed vertically and horizontally, so that the planar conveyance apparatus 71 is configured. The conveyance device 1 forms one conveyance cell of the planar conveyance apparatus 71, and the large number of conveyance cells (conveyance devices 1) are planarly spread, so that the planar conveyance apparatus 71 is configured. In this embodiment, the 48 conveyance devices (conveyance cells) 1 are arrayed in a rectangular shape in plan view.

The planar conveyance apparatus 71 is disposed in a branching unit or a sorting region of a conveyor line (not illustrated) for conveying an article.

An article that is conveyed from another conveyance device disposed on an upstream side of the conveyor line to the planar conveyance apparatus 71 is laid on any of the conveyance cells (conveyance devices 1). Then, the motor for turning 8 is driven by the control device (not illustrated), and the article passes through the conveyance device 1, is sequentially transferred to a conveyance cell (conveyance device 1) adjacent to the above conveyance device, and finally moves to the downstream side of the planar conveyance apparatus 71.

More specifically, when the motor for traveling 9 is driven, the belt 2 composing the conveying surface travels, and the article is placed on the belt 2. Furthermore, the belt 2 of any adjacent conveyance cell (conveyance device 1) also travels. As a result, the article is discharged from the conveyance cell (conveyance device 1), on which the article is first placed, by the traveling belt 2 of this conveyance cell (conveyance device 1), and is transferred to any adjacent conveyance cell (conveyance device 1).

Conveyance destination information of the article is recorded as optically read information such as a bar code on a lower surface of the article, and this conveyance destination information is read by the sensor 16. The conveyance destination information read by the sensor 16 is sent to the control device (not illustrated), and the control devices sequentially rotate the respective traveling belts 2 of the conveyance cells (conveyance devices 1) as a conveyance passage in response to a conveyance destination, and adjust rotation angle positions of the motors for turning 8 of the conveyance cells (conveyance devices 1) as the conveyance passage.

When the motors for turning 8 are driven, the travel parts 5 turn along with the turning tables 6. Therefore, when the motors for turning 8 are driven, it is possible to change the conveying direction of the article.

Additionally, a sequential control method for performing communication between the adjacent conveyance cells (conveyance devices 1) and taking over the conveyance destination information of the article is effective.

In a case where the planar conveyance apparatus 71 is disposed in the sorting region 29, when the article is conveyed from the direction of an arrow W in the sorting region 29, the respective conveying directions of the conveyance devices 1 are changed, so that it is possible to convey the article in the directions illustrated by arrows X, Y, Z, for example.

Figure 9:
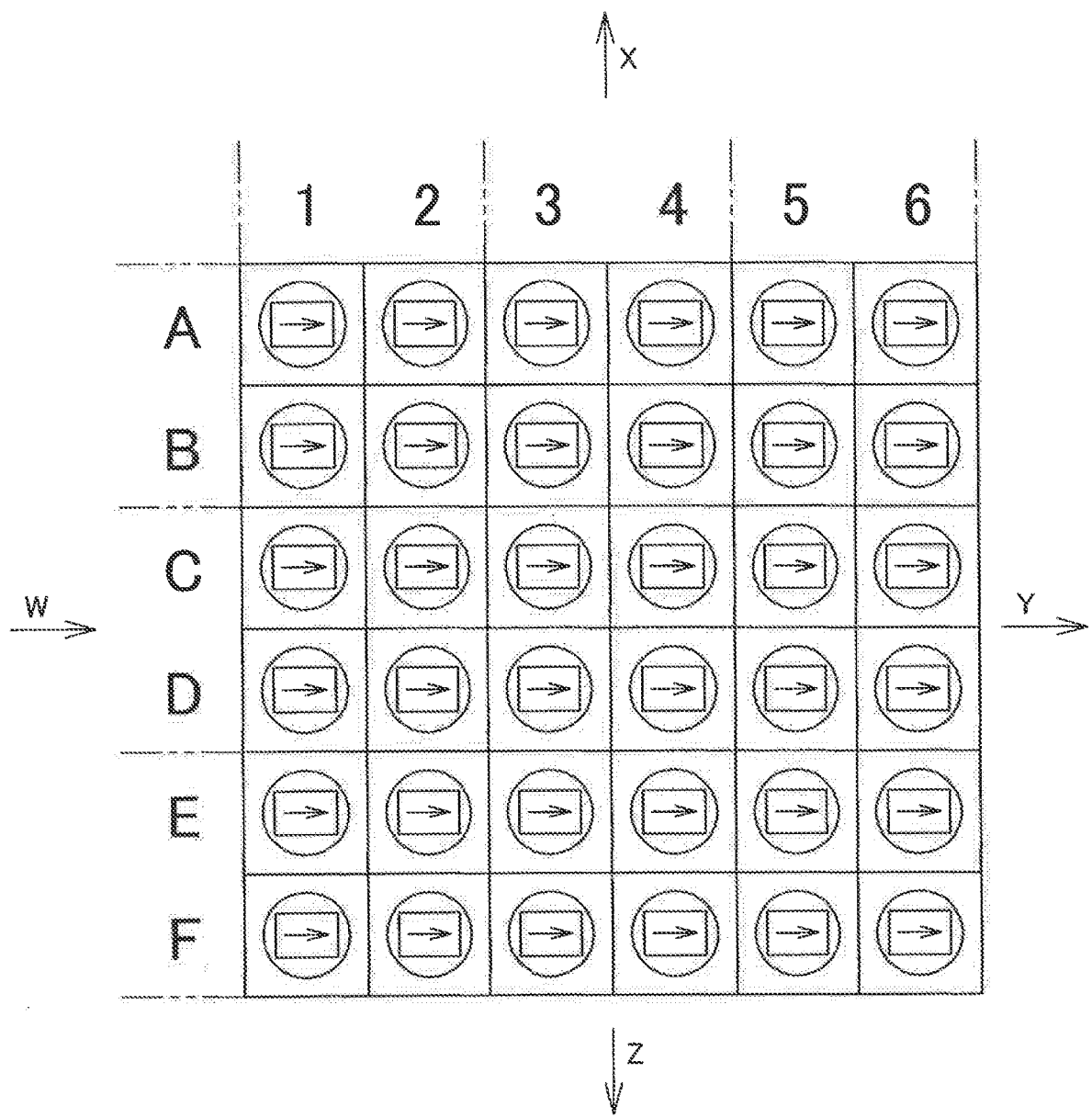
FIG. 9 is a schematic plan view of a planar conveyance apparatus configured by disposing a large number of the conveyance devices of FIG. 1 vertically and horizontally, and illustrates a state where the belt traveling directions of all the conveyance devices coincide with each other.

In the example illustrated in FIG. 9, all of a first column to a sixth column of an A row to an F row of the sorting region 29 are directed in the arrow Y direction, and an article that enters the sorting region 29 from any of the A and B rows, C and D rows, and E and F rows is conveyed in the arrow Y direction.

Figure 10:
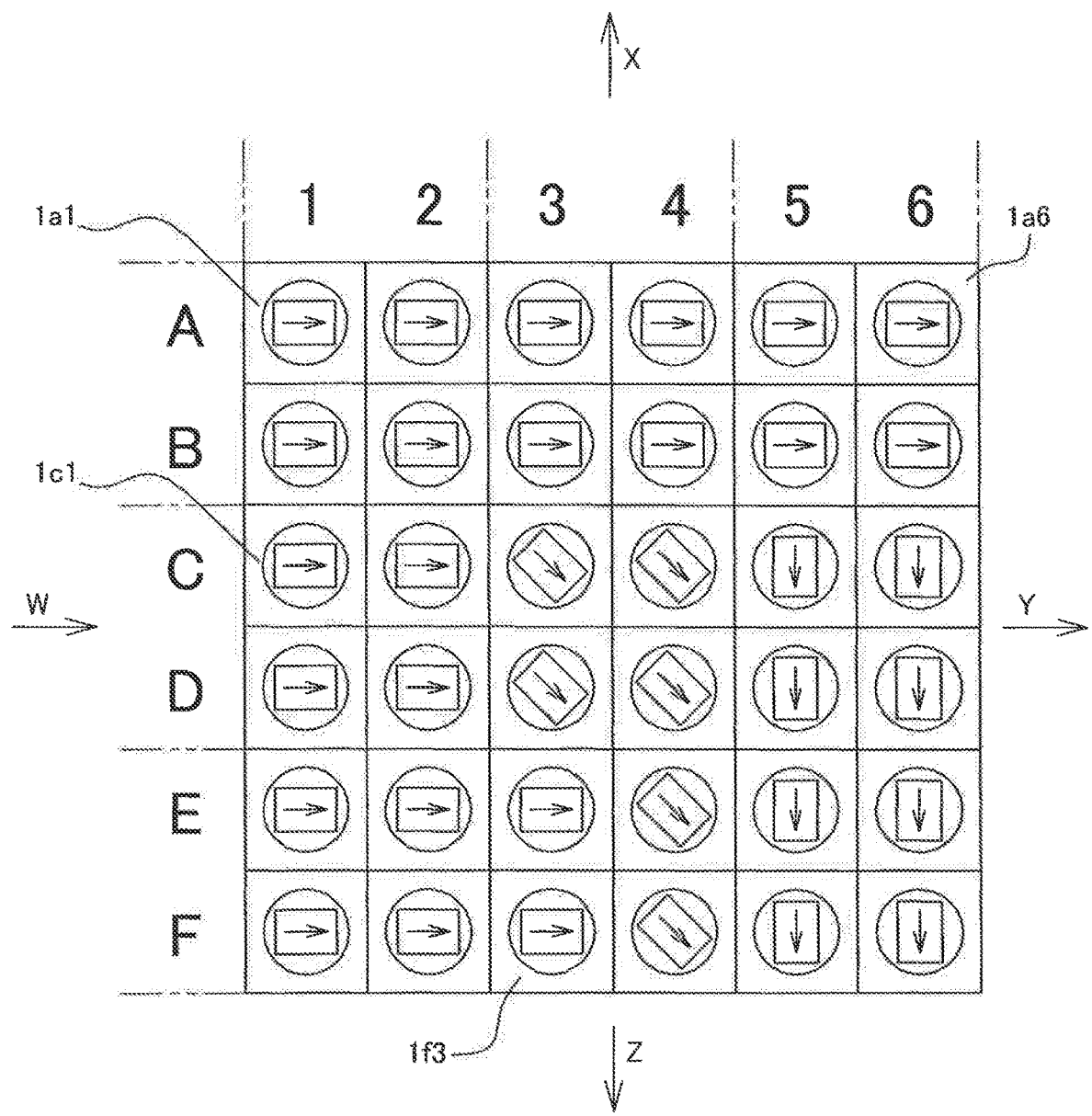
FIG. 10 is a schematic plan view illustrating a state where the belt traveling direction of each conveyance device is set in accordance with the conveying direction of an article, in the planar conveyance apparatus of FIG. 9.
Figure 11:
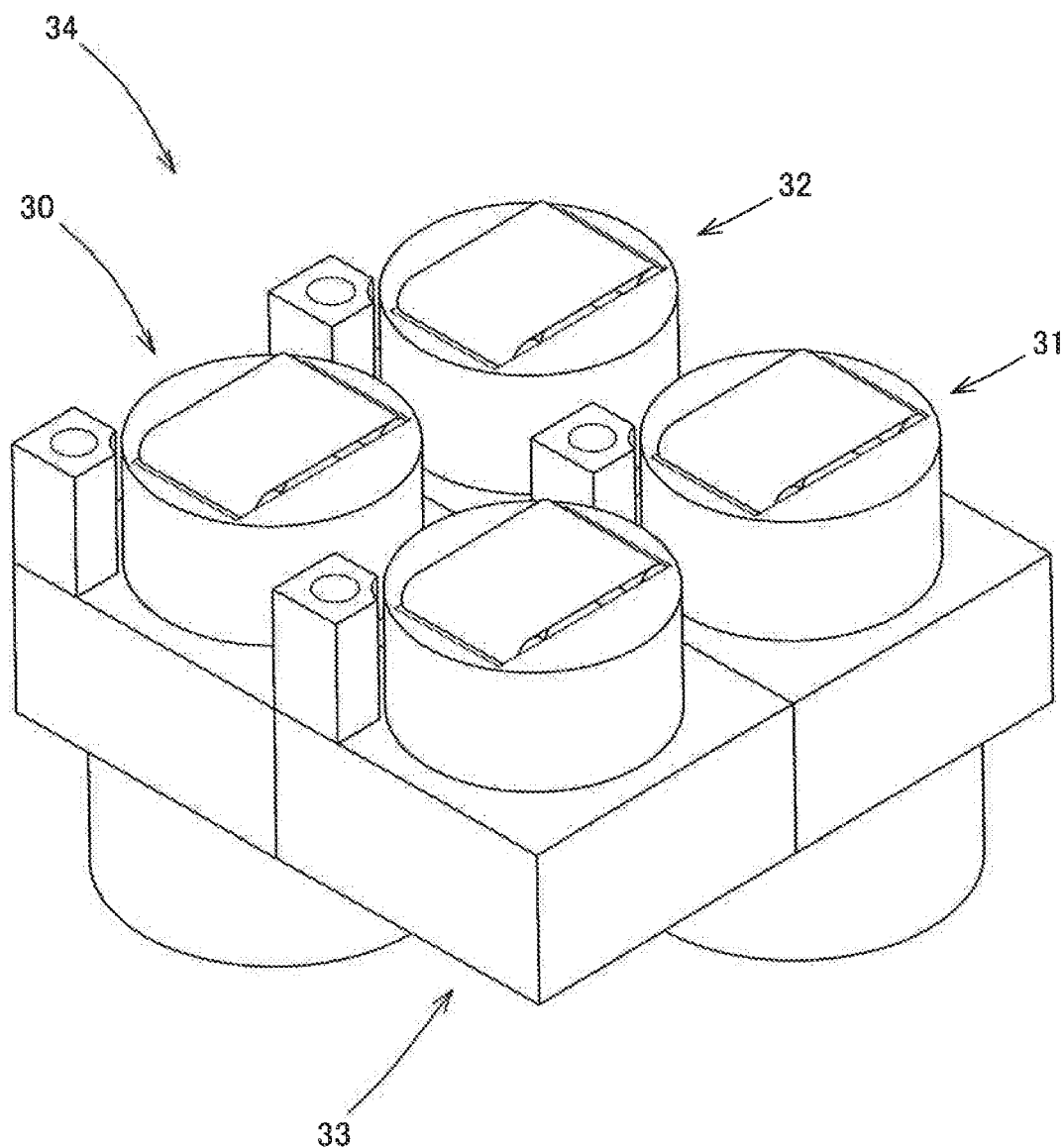
FIG. 11 is a perspective view of a conveyance device different from the conveyance device in FIG. 1.

In the example illustrated in FIG. 10, all of the conveying directions of the conveyance devices 1 in the A and B rows of the sorting region 29 are directed in the arrow Y direction, and articles that enter from the A and B rows are conveyed in the arrow Y direction.

However, in the C and D rows, while the conveyance devices 1 in the first and second columns are directed in the arrow Y direction, the conveyance devices 1 in the third and fourth columns are directed in the intermediate direction between the arrow Y direction and the arrow Z direction, and the conveyance devices 1 in the fifth and sixth columns are directed in the arrow Z direction. Therefore, the traveling directions of articles that enter the sorting region 29 from the C and D rows are changed in the third and fourth columns by 45 degrees, and further changed in the fifth and sixth columns by 45 degrees to be smoothly conveyed in the arrow Z direction orthogonal to the arrow Y direction. Additionally, the conveying directions of the adjacent conveyance devices 1 in the fifth and sixth columns of the E and F rows are directed in the arrow Z direction, and therefore the articles that enter from the C and D rows pass through the E and F rows to be discharged in the arrow Z direction.

Articles that enter the sorting region 29 from the F and F rows are also finally discharged in the arrow Z direction by the conveyance devices 1 in the fifth and sixth columns.

Thus, the conveying direction of each conveyance device 1 is suitably changed, so that it is possible to convey an article in any of the X, Y and Z directions on the downstream side of the sorting region 29.

Additionally, it is possible to more finely sort and convey articles.

For example, it is possible to perform operation for discharging an article from a conveyance device 1*f*3 in the F row of the third column, the article entering from a conveyance device 1*a*1 in the A row of the first column. Further, it is possible to perform operation for discharging an article from a conveyance device 1*a*6 in the A row of the sixth column, the article entering from a conveyance device 1*e*1 in the C row of the first column.

The number of the conveyance devices 1 to be used at the same time changes depending on the size of an article to be conveyed. That is, depending on the case such as, where an article that fits within only two rows, for example, the A row and the B row are conveyed, and where an article having a width from the A row to any of the C row, the D row, the E row, and the F row are conveyed, the conveyance devices 1 on which the article is placed, are operated to have the same conveying directions and speed.

Further, all of the traveling directions of the belts 2 coincide with the arrow Y direction, and the traveling speeds of the belts 2 of the respective control devices (not illustrated) provided in the conveyance devices 1 are set so as to be lowered from the A row side to the F row side, so that it is possible to move an article in the arrow Z direction.

In a case where the article conveying direction is changed, the direction of the one (1 column) conveyance device 1 may be completely changed. However, when the angle of the conveyance device 1 on the upstream side is changed by only a predetermined angle, and the angle of the conveyance device 1 on the downstream side is further changed by a remaining angle, it is possible to smoothly change the article conveying direction. Additionally, when the conveying direction is thus gradually changed by a plurality of the conveyance device 1 from the upstream side to the downstream side, inertia force is unlikely to act on an article to be conveyed, and the article to be conveyed is unlikely to fall and be damaged.

Thus, the respective conveyance devices 1 of this embodiment include the respective motors for turning 8 and the respective motors for traveling 9, and the control devices are mounted in the respective conveyance devices 1. Therefore, the individual conveyance devices 1 can perform different operation, and can finely move an article in the sorting region 29. For example, the article can be moved so as to meander in the sorting region 29.

By use of the planar conveyance apparatus 71, articles can be aligned, or the directions of articles can be aligned. For example, in a field of a conveyor, there is operation that is called palletizing. The palletizing is work for piling up articles on a pallet for placing the articles. As preparation for performing this work, work for aligning articles in a line, and aligning the directions of the articles. This work can be performed by the planar conveyance apparatus 71.

In the conveyance device 1, the article is conveyed in a state of being placed on a portion composing the conveying surface of the belts 2 (contact member, endless member) of the travel part 5, and therefore the article and the belt 2 are not rubbed. Therefore, the article is unlikely to be abrasion.

Now, a conveyance unit 34 which is desirably employed as a component of the planar conveyance apparatus will be described. The conveyance unit 34 is also the small-sized planar conveyance apparatus. The conveyance unit 34 described below is a unit obtained by combining the four conveyance devices, and a travel part 5 and a turning table 46 belonging to the unit synchronously operate.

A structure of each of four conveyance devices 30, 31, 32, 33 belonging to the conveyance unit 34 is different from the structure of the above conveyance device 1.

As illustrated in FIG. 11, FIG. 15, FIG. 16A and FIG. 16B, the conveyance unit 34 has one main conveyance device 31, one sub conveyance device (auxiliary conveyance device in claims) 30, two auxiliary conveyance devices 32, 33, and a transmission mechanism part 49. For the sake of convenience of description of the structure of the conveyance unit 34, the "main conveyance device", the "sub conveyance device," and the "auxiliary conveyance device" are merely distinguished, and in a conveyance unit having other structure, a device having a function of the "main conveyance device" may be used as the "sub conveyance device" or the "auxiliary conveyance device". Additionally, the "sub conveyance device" is an aspect of the "auxiliary conveyance device" that is a component of the invention recited in claims, and is an aspect of the "main conveyance device".

In the conveyance unit 34, the sub conveyance device 30, the main conveyance device 31, and the auxiliary conveyance devices 32, 33 are employed as respective conveyance cells, and the conveyance cells are disposed in a quadrangular shape. That is, a line connecting respective centers of the conveyance cells (the sub conveyance device 30, the main conveyance device 31, the auxiliary conveyance devices 32, 33) composing the conveyance unit 34 forms a square, in a case where the conveyance unit is produced by the three conveyance cells, the conveyance cells are disposed in a triangular shape. In a case where the conveyance unit is produced by the five conveyance cells, the conveyance cells are disposed in a pentagonal shape. This is also applicable to other conveyance unit described below.

The conveyance unit 34 has the transmission mechanism part 49 as described below, gears composing the transmission mechanism part 49 are disposed in a polygonal shape formed by the line connecting the centers of the conveyance cells, and therefore the number of the conveyance cells is limited to a range of 3 to 6 on an actual layout.

The conveyance unit 34 has the transmission mechanism part 49.

The sub conveyance device 30, the main conveyance device 31, the auxiliary conveyance devices 32, 33 each have a travel part 5 and a housing 7 that are the same as those of the conveyance device 1, and overlapped description will be omitted.

Figure 16A:
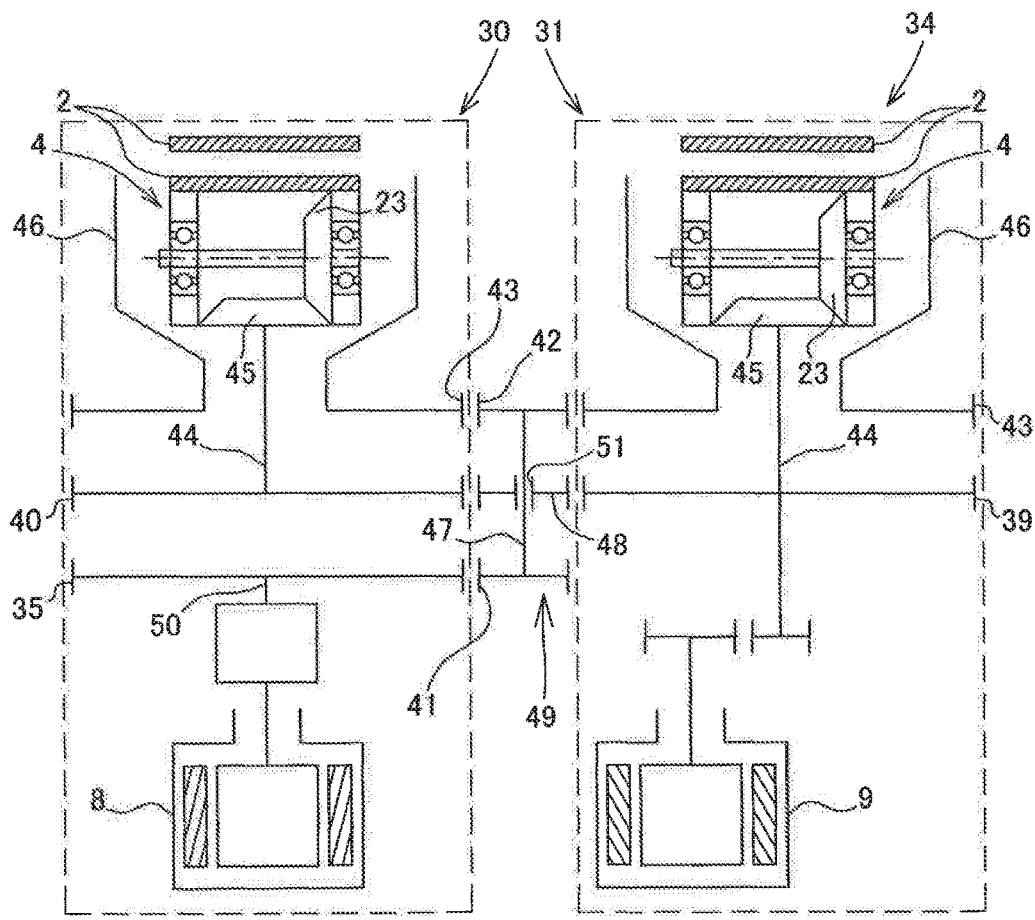
FIG. 16A is a skeleton view viewed along arrows A-A in FIG. 15.
Figure 16B:
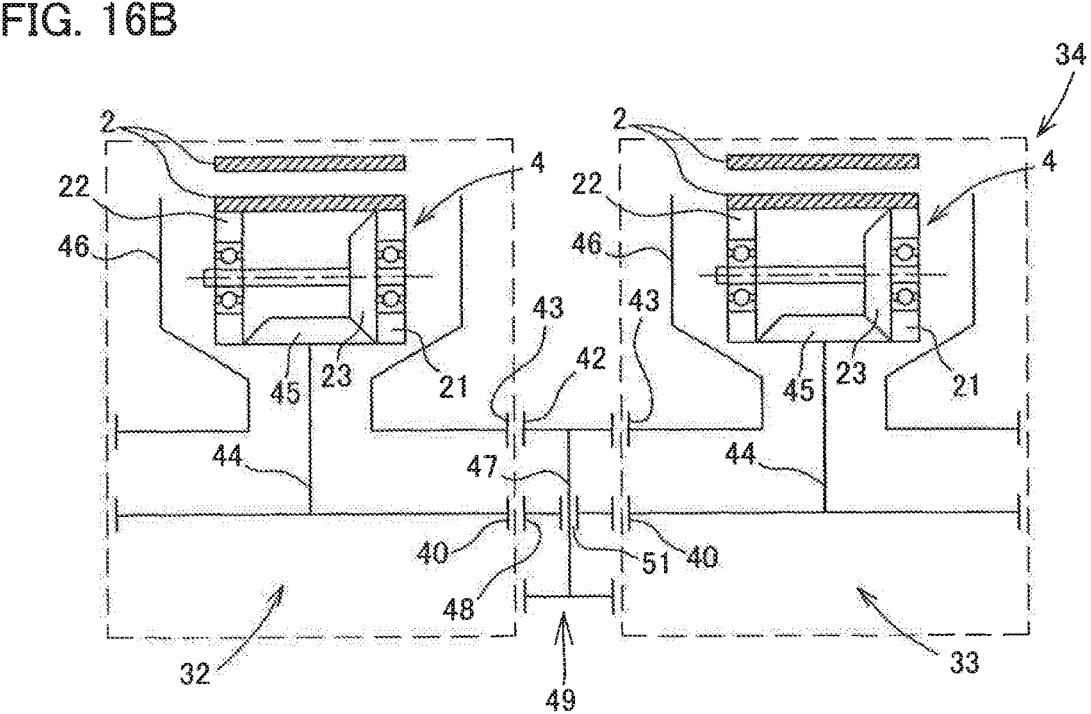
FIG. 16B is a skeleton view viewed along arrows B-B in FIG. 15.

As illustrated in FIG. 16A and FIG. 16B, the transmission mechanism part 49 has a gear (engaging member for turning force transmission, fifth engaging member) 41, a gear (engaging member for turning force transmission, fifth engaging member) 42, a turning system transmission mechanism composed of a shaft 47, and a traveling system transmission mechanism composed of a gear (engaging member for traveling force transmission, sixth engaging member) 48.

The turning system transmission mechanism has a structure in which the gears 41, 42 are fixed to the shaft 47. That is, the shaft 47, and the gears 41, 42 are integrated with each other. The gears 41, 42 are fixed to the shaft 47 at a predetermined distance.

As illustrated in FIG. 16A, a gear 48 belonging to the traveling system transmission mechanism is mounted on a portion in the middle of the shaft 47 through a bearing 51. That is, a hole 48a (FIG. 15) for allowing the bearing 51 to be disposed is provided at a central part of the gear 48. The gear 48 belonging to the traveling system transmission mechanism is relatively rotatable with respect to the shaft 47.

The gears 41, 42 as the engaging members for turning force transmission, and the gear 48 as the engaging member for traveling force transmission are installed at different heights.

Figure 12:
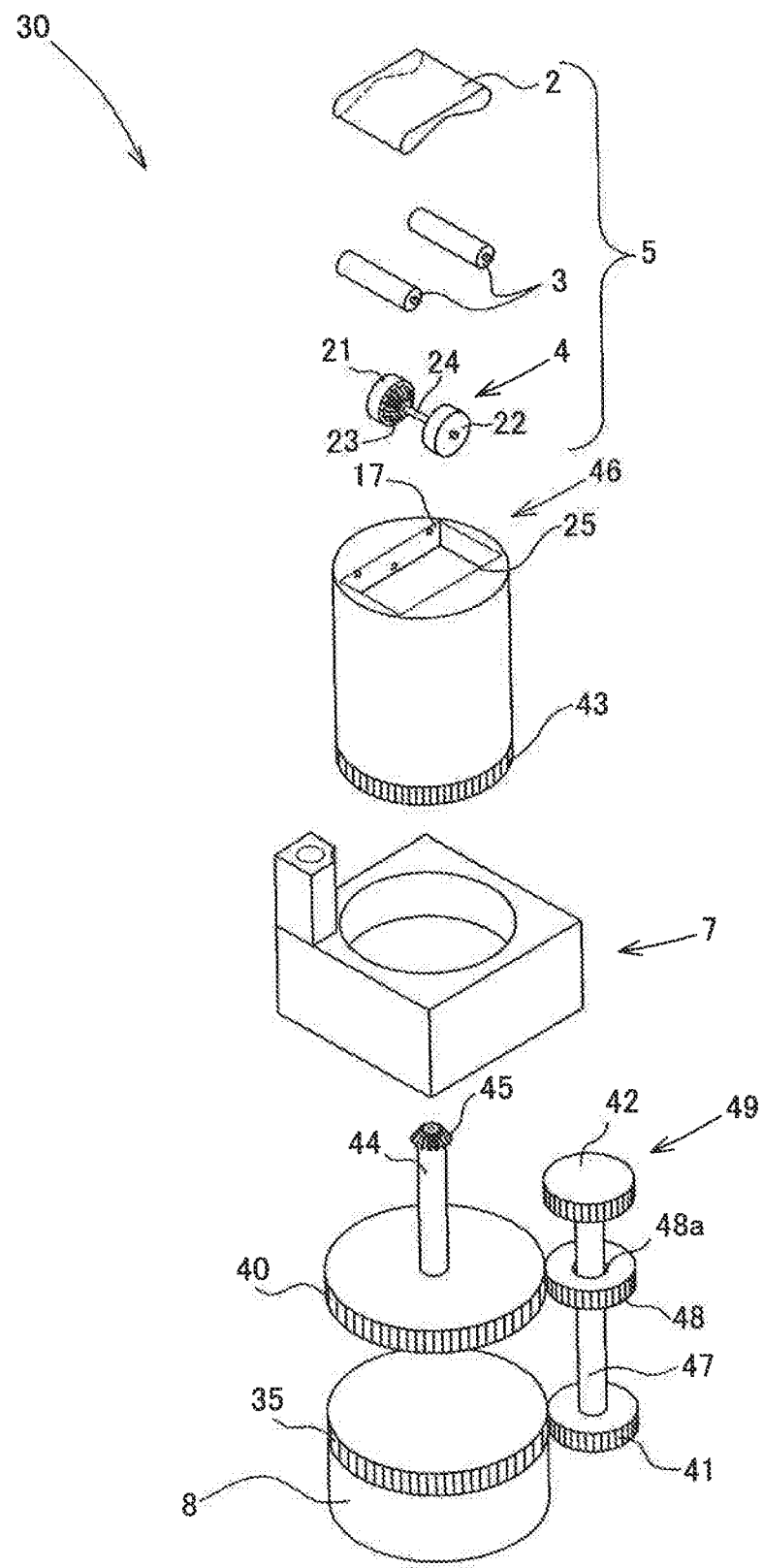
FIG. 12 is an exploded perspective view of a sub conveyance device of the conveyance device in FIG. 11.

As illustrated in FIG. 12, the sub conveyance device 30 has a turning table 46, a motor for turning 8, and an output gear 35 (engaging member for turning force output, fourth engaging member), and a drive shaft 44.

The turning table 46 has a cylindrical structure, and a fixing part 17 and an opening 25 similar to those of the turning table 6 illustrated in FIG. 2 are provided in an upper part of the turning table 46. An engaging part 43 (engaging member for turning, first engaging member) is provided in a lower part of a cylindrical curved surface of the turning table 46. The engaging part 43 composes an external gear.

The motor for turning 8 includes an output shaft 50 (FIG. 16). The output shaft 50 is provided with the output gear 35 (engaging member for turning force output).

A driven gear 40 (engaging member for traveling, third engaging member) is provided in a lower part of the drive shaft 44. Additionally, a bevel gear part 45 is provided in an upper part of the drive shaft 44. The drive shaft 44, the driven gear 40, and the bevel gear part 45 are integrally fixed to each other.

The output gear 35 (engaging member for turning force output) of the motor for turning 8 is engaged with the gear 41 (engaging member for turning force transmission) of the transmission mechanism part 49.

The driven gear 40 (engaging member for traveling) integrated with the drive shaft 44 is engaged with the gear 48 (engaging member for traveling force transmission) of the transmission mechanism part 49.

The bevel gear part 45 integrated with the drive shaft 44 is engaged with the bevel gear part 23 of the driving roller 4 of the travel part 5.

In the sub conveyance device 30, no motor for traveling 9 like the motor for traveling 9 of the conveyance device 1 (FIG. 2, FIG. 6) is provided.

Figure 13:
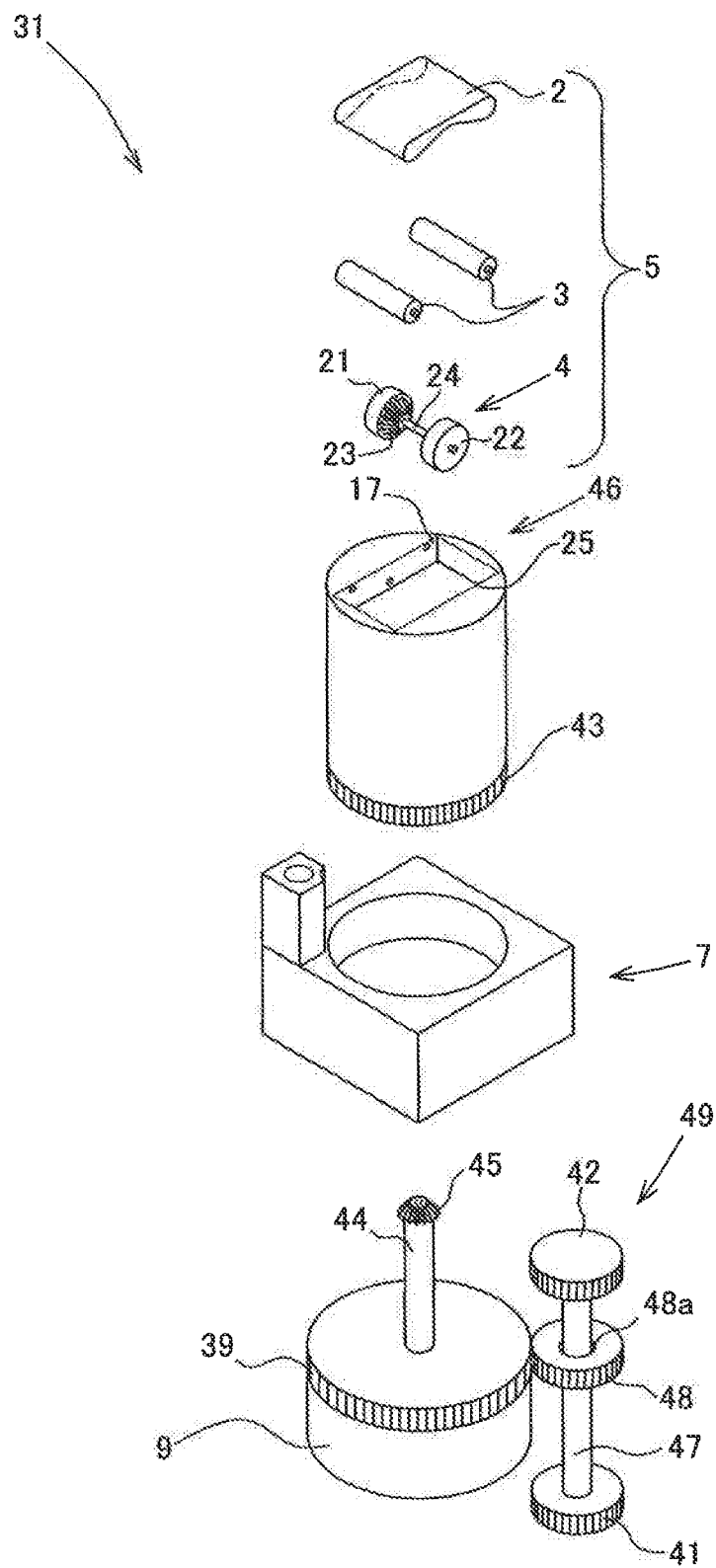
FIG. 13 is an exploded perspective view of a main conveyance device of the conveyance device in FIG. 11.

The main conveyance device 31 has a turning table 46, a motor for traveling 9, an output gear 39 (engaging member for turning force output, second engaging member), and a drive shaft 44 as illustrated in FIG. 13.

The turning table 46 has the same structure as the turning table 46 of the sub conveyance device 30.

The drive shaft 44 composes an output shaft of the motor for traveling 9 that is a geared motor. In the drive shaft 44, the output gear 39 is provided. The output gear 39 rotates integrally with the drive shaft 44.

The bevel gear part 45 provided in the drive shaft 44 is engaged with the bevel gear part 23 of the driving roller 4 of the travel part 5.

Figure 15:
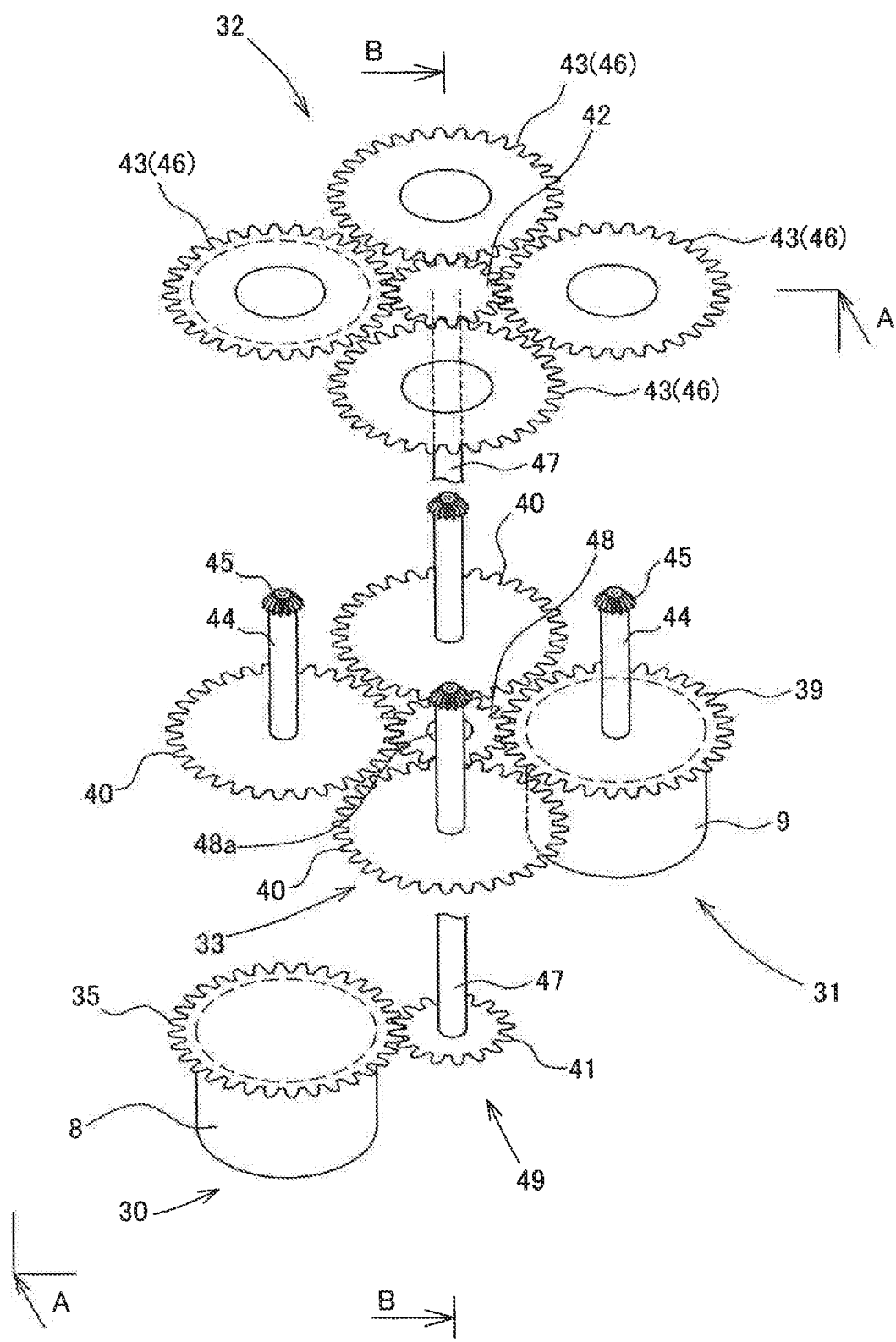
FIG. 15 is a power system view of the conveyance device in FIG. 11.

As illustrated in FIG. 13, the gear 48 of the transmission mechanism part 49 is engaged with the output gear 39, as illustrated in FIG. 15 and FIG. 16A.

As illustrated in FIG. 15 and FIG. 16B, the gear 42 of the transmission mechanism part 49 is engaged with the engaging part 43 (external tooth) of the turning table 46.

Figure 14:
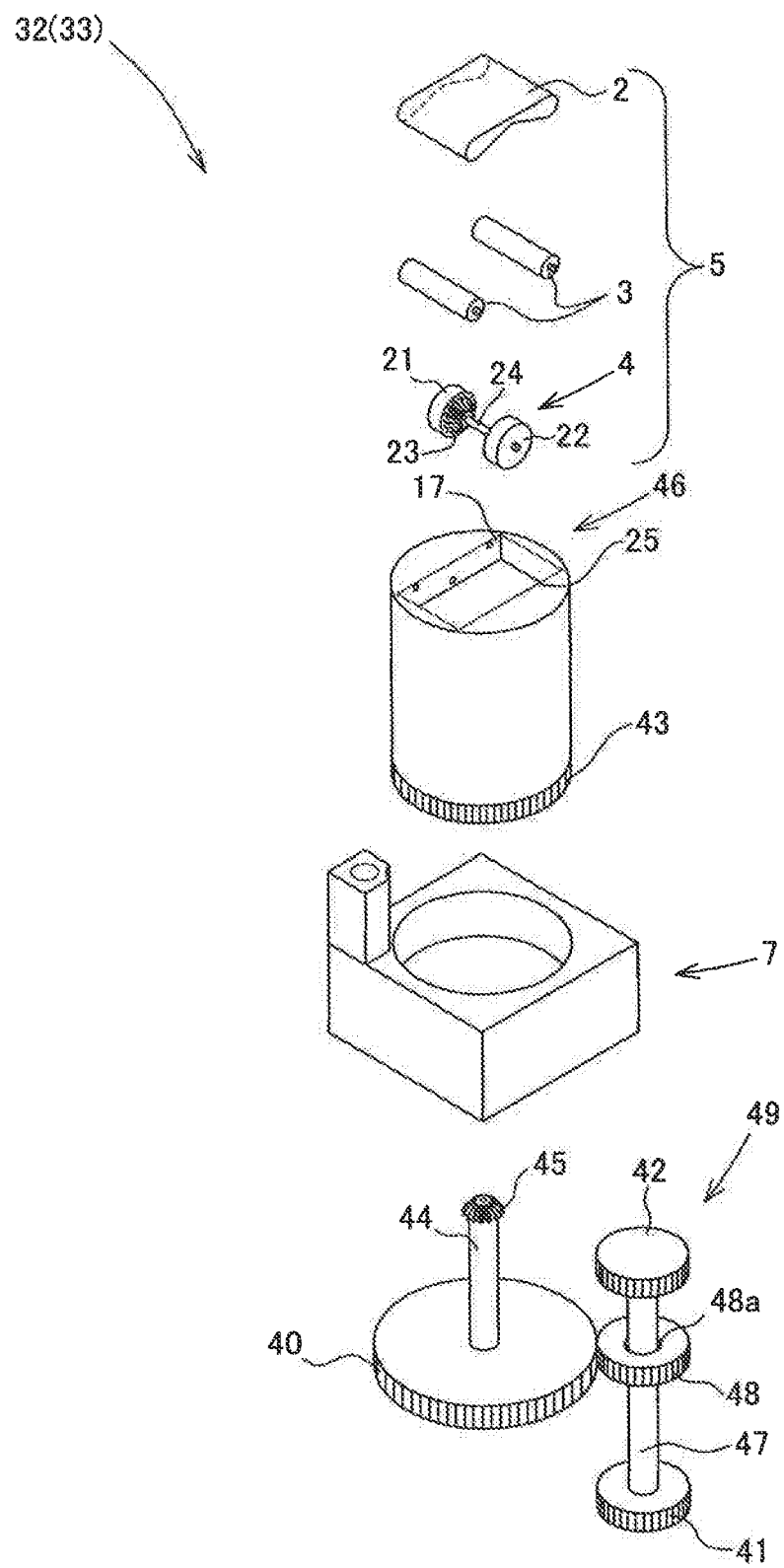
FIG. 14 is an exploded perspective view of an auxiliary conveyance device of the conveyance device in FIG. 11.

As illustrated in FIG. 14, the auxiliary conveyance devices 32, 33 each have a turning table 46 and a drive shaft 44. The turning table 46 has the same structure as the turning tables 46 of the sub conveyance device 30 and the main conveyance device 31.

As illustrated in FIG. 15 and FIG. 16B, the engaging part 43 (external tooth) of the turning table 46 is engaged with the gear 42 of the transmission mechanism part 49.

As illustrated in FIG. 14, in the drive shaft 44, the bevel gear part 45 and the driven gear 40 are provided.

The bevel gear part 45 is engaged with the bevel gear part 23 of the driving roller 4 of the travel part 5.

The driven gear 40 is engaged with the gear 48 of the transmission mechanism part 49.

As illustrated in FIG. 15 and FIG. 16A, the output gear 35 (engaging member for turning force output) of the sub conveyance device 30 is engaged with the gear 41 of the transmission mechanism part 49. As illustrated in FIG. 15, FIG. 16A and FIG. 16B, the gear 42 of the transmission mechanism part 49 is engaged with the engaging part 43 (engaging member for turning) of the turning table 46 provided in each of the sub conveyance device 30, the main conveyance device 31 and the auxiliary conveyance devices 32, 33.

That is, power of the motor for turning 8 of the sub conveyance device 30 is transmitted to the engaging part 43 (engaging member for turning) of the turning table 46 provided in each of the sub conveyance device 30, the main conveyance device 31 and the auxiliary conveyance devices 32, 33 through the output gear 35 (engaging member for turning force output), and the transmission mechanism part 49 (the gear 41, the shaft 47, the gear 42).

Power of the motor for traveling 9 of the main conveyance device 31 is transmitted to the bevel gear part 23 of the driving roller 4 (driving body) of the main conveyance device 31 through the drive shaft 44 and the bevel gear part 45 of the main conveyance device 31.

Power of the motor for traveling 9 of the main conveyance device 31 is transmitted to each of the driven gears 40 (engaging members for traveling) of the sub conveyance device 30, and the auxiliary conveyance devices 32, 33 through the output gear 39 (engaging member for traveling force output), and the gear 48 (engaging member for traveling force transmission) of the transmission mechanism part 49. Then, the power of the motor for traveling 9 is transmitted to the bevel gear part 23 of the driving roller 4 (driving body) of the travel part 5 through the drive shaft 44, and the bevel gear part 45, in each of the sub conveyance device 30, and the auxiliary conveyance devices 32, 33.

Figure 17:
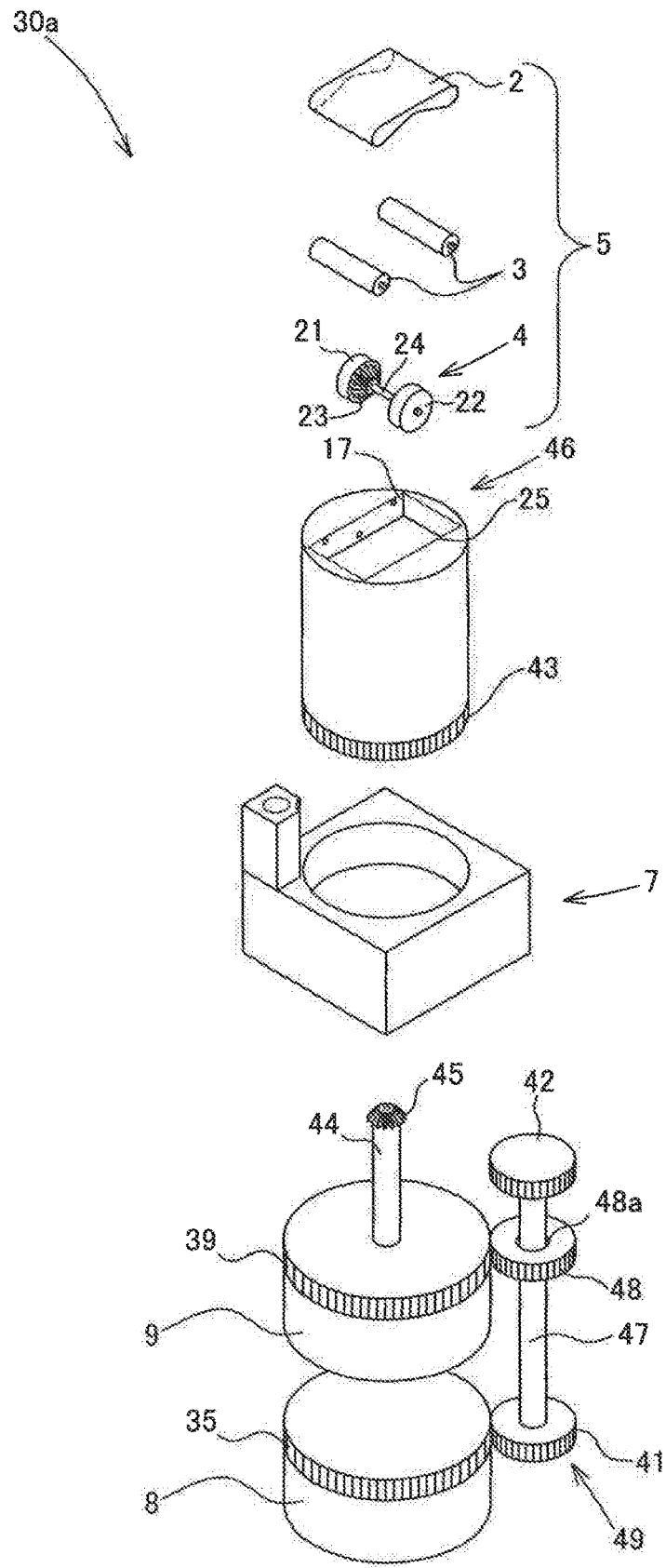
FIG. 17 is an exploded perspective view illustrating a modification of the main conveyance device in FIG. 12.

FIG. 15 and FIG. 16A illustrate an example in which the motor for traveling 9 is provided in the main conveyance device 31. However, as illustrated in FIG. 17, the motor for traveling 9 may be provided in the sub conveyance device 30, and a configuration of the main conveyance device 31 may be the same as configurations of the auxiliary conveyance devices 32, 33.

Now, a conveyance unit 60 according to another embodiment of the present invention will be described. The conveyance unit 60 is also a small-sized planar conveyance apparatus.

Figure 18:
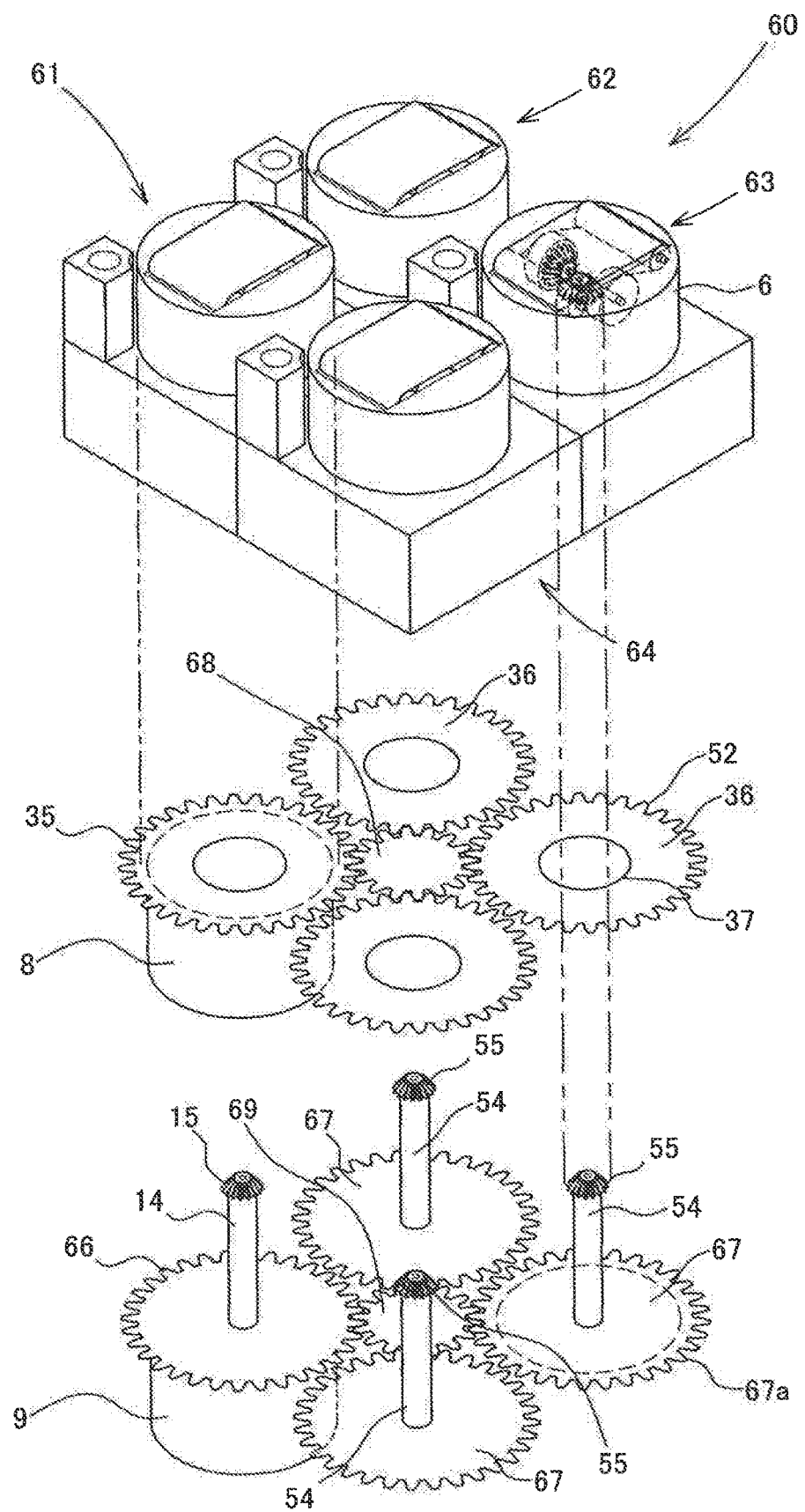
FIG. 18 is a power system view of the planar conveyance apparatus according to the embodiment of the present invention.

As illustrated in FIG. 18, the conveyance unit 60 has a main conveyance device 61, and auxiliary conveyance devices 62 to 64.

The main conveyance device 61 has substantially the same configuration as the conveyance device 1 illustrated in FIG. 1, FIG. 2, and the like, and overlapped description will be omitted. The main conveyance device 61 has an output gear 35 (engaging member for turning force output), and an output gear 66 (engaging member for traveling force output) in addition to the configuration of the conveyance device 1.

Figure 19:
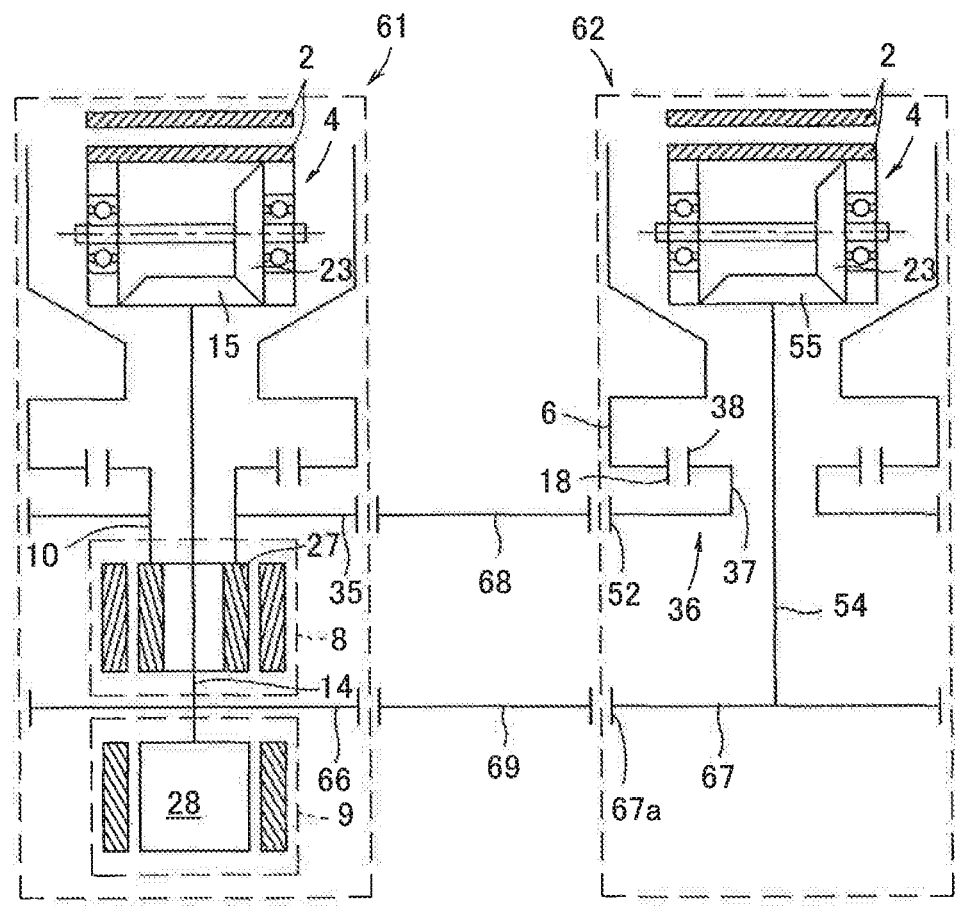
FIG. 19 is a skeleton view of a conveyance device of FIG. 18.

The output gear 35 (engaging member for turning force output) is provided in an output shaft 10 (output part) of a motor for turning 8, as illustrated in FIG. 19.

The output gear 66 (engaging member for traveling force output) is provided in a drive shaft 14 (drive shaft) that is an output shaft of a motor for traveling 9.

As illustrated in FIG. 18 and FIG. 19, an intermediate gear 68 is engaged with the output gear 35 (engaging member for turning force output), and an intermediate gear 69 is engaged with the output gear 66 (engaging member for traveling force output).

As illustrated in FIG. 18 and FIG. 19, the auxiliary conveyance device 63 has a travel part 5 and a turning table 6 similar to those of the conveyance device 1.

Additionally, the auxiliary conveyance device 63 has an engaging member for turning 36 (first engaging member), and an engaging member for traveling 67.

As illustrated in FIG. 19, the engaging member 36 for turning is cylindrical, and has a through hole 37. Additionally, the engaging member 36 for turning has a turning table side gear part 38 (turning table connection part) and an intermediate gear side gear part 52.

The turning table side gear part 38 is engaged with an engaging part 18 (internal teeth) of the turning table 6. The intermediate gear side gear part 52 is engaged with the intermediate gear 68.

As illustrated in FIG. 19, the engaging member for traveling 67 has a drive shaft 54 (drive shaft). In the drive shaft 54, a bevel gear part 55 is provided. The bevel gear part 55 is engaged with a bevel gear part 23 of a driving roller 4 (driving body) of a travel part 5. In the engaging member for traveling 67, a gear part 67a is provided. The gear part 67a is engaged with the intermediate gear 69.

Power of the motor for turning 8 provided in the main conveyance device 61 is transmitted to the turning table 6 (engaging part 18) of the auxiliary conveyance device 63 through the engaging member 36 for turning, the intermediate gear 68, the output gear 35 (engaging member for turning three output). Accordingly, when the motor for turning 8 is driven, respective turning tables 6 of the main conveyance device 61 and the auxiliary conveyance device 62 turn.

Power of the motor for traveling 9 provided in the main conveyance device 61 is transmitted to the travel part 5 (belt 2) of the auxiliary conveyance device 63 through the drive shaft 54 (drive shaft), the engaging member for traveling 67, the intermediate gear 69, and the output gear 66 (engaging member for traveling force output). Accordingly, when the motor for traveling 9 is driven, the respective belt 2 (contact member, endless member) of the travel parts 5 of the main conveyance device 61 and the auxiliary conveyance device 63 travel.

The auxiliary conveyance devices 62, 64 each have the same structure as the auxiliary conveyance device 63, and overlapped description will be omitted. That is, when the motor for turning 8 of the main conveyance device 61 is driven, the respective turning tables 6 of the auxiliary conveyance devices 62, 64 turn at the same time. Additionally, when the motor for traveling 9 of the main conveyance device 61 is driven, the respective belts 2 (contact members, endless members) of the travel parts 5 of the auxiliary conveyance devices 62, 64 travel at the same time.

Now, a conveyance unit 70 (planar conveyance apparatus) according to another embodiment of the present invention will be described.

Figure 20:
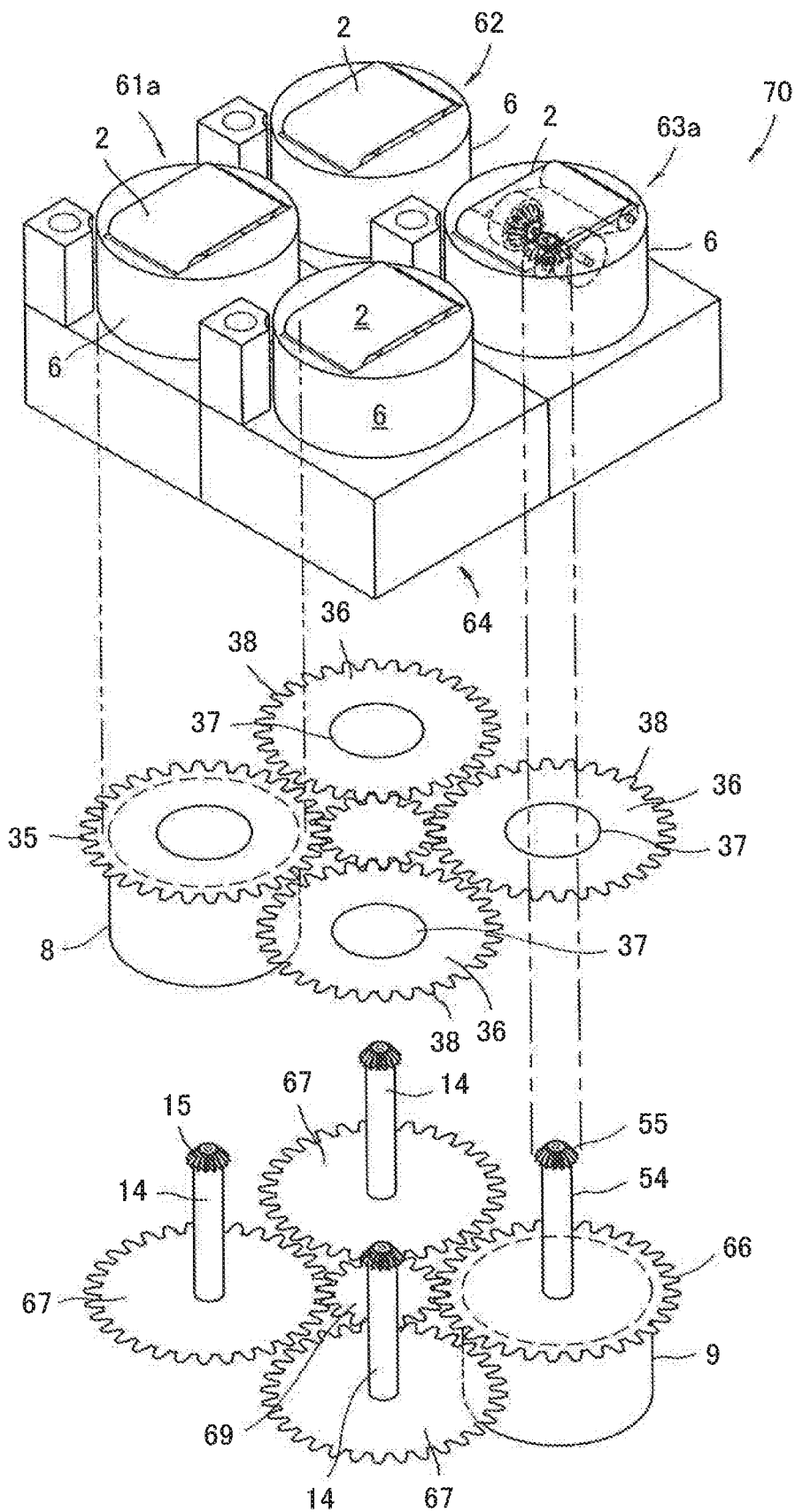
FIG. 20 is a power system view of a planar conveyance apparatus of a modification of FIG. 18.

As illustrated in FIG. 20, the conveyance unit 70 has a main conveyance device 61a, and auxiliary conveyance devices 62, 63a, 64. Configurations of the main conveyance device 61a and the auxiliary conveyance device 63a of the conveyance unit 70 are partially different from the configurations of the main conveyance device 61 and the auxiliary conveyance device 63 of the conveyance unit 60, but other configuration of the conveyance unit 70 is the same of the configuration of the conveyance unit 60.

Configurations of the auxiliary conveyance devices 62, 64 of the conveyance unit 70 are the same as the configurations of the auxiliary conveyance devices 62, 64 of the conveyance unit 60.

Figure 21:
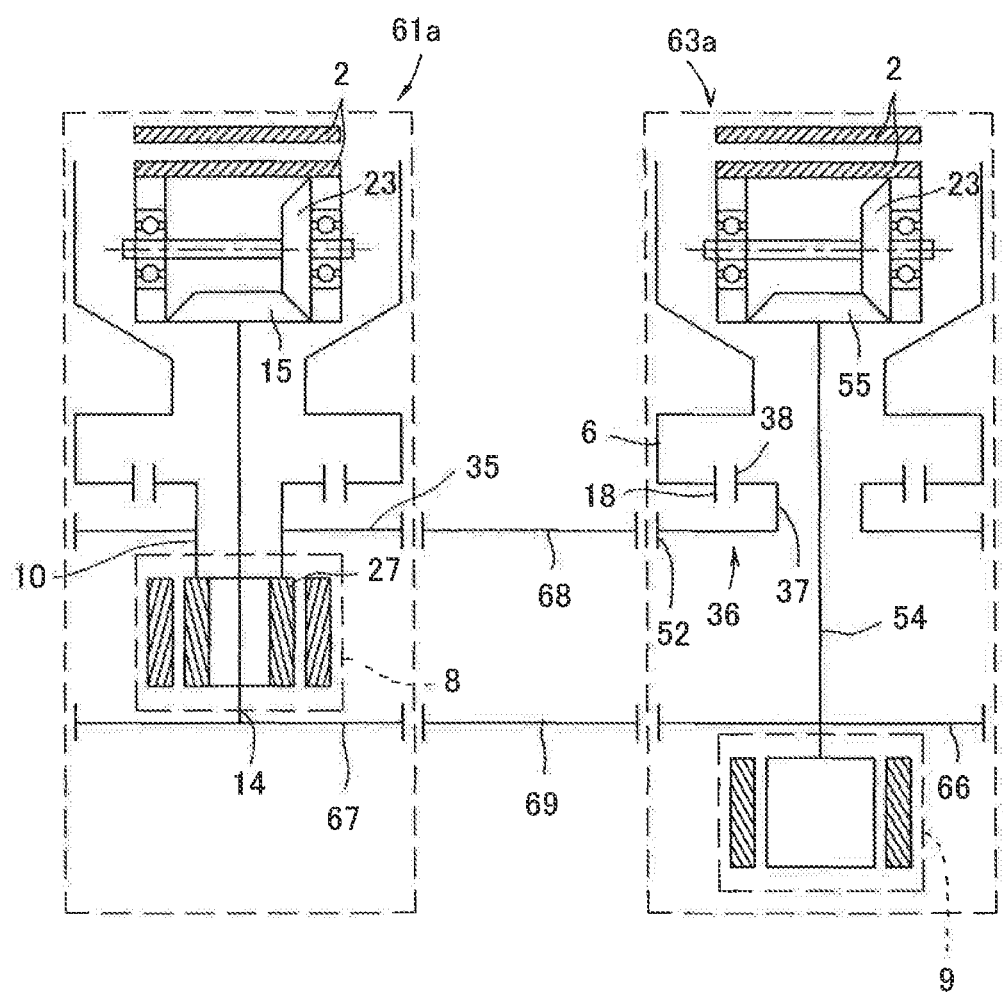
FIG. 21 is a skeleton view of a main conveyance device having a motor for turning, and an auxiliary conveyance device having a motor for traveling of the planar conveyance apparatus in FIG. 20.

The main conveyance device 61a has engaging members for traveling 67 in place of the motor for traveling 9. That is, drive shafts 14 and the engaging members for traveling 67 are integrally fixed to each other. The centers of the drive shafts 14 and the engaging members for traveling 67 coincide with each other. As illustrated in FIG. 20 and FIG. 21, the engaging members for traveling 67 are engaged with an intermediate gear 69.

The auxiliary conveyance device 63a has a motor for traveling 9. An output shaft of the motor for traveling 9 is a drive shaft 54 (drive shaft). On the drive shaft 54, an output gear 66 (engaging member for traveling force output) is provided. The output gear 66 is engaged with the intermediate gear 69.

That is, when the motor for traveling 9 is driven, the drive shaft 54 rotates, a belt 2 (contact member, endless member) of a travel part 5 of the auxiliary conveyance device 63a travels. Additionally, when the motor for traveling 9 is driven, power is transmitted to each of the engaging members for traveling 67 through the output gear 66 integrated with the drive shaft 54, and the intermediate gear 69, and each drive shaft 14 rotates. Therefore, belts 2 (contact members, endless members) of travel parts 5 of the main conveyance device 61a, and the auxiliary conveyance devices 62, 64 travel.

Turning tables 6 of the main conveyance device 61a, and the auxiliary conveyance devices 62, 63a, 64 in the conveyance unit 70 operate in a similar manner to the turning tables 6 of the main conveyance device 61, auxiliary conveyance devices 62 to 64 in the conveyance unit 60.

The belts 2 (contact members, endless members) of the travel parts 5 of the auxiliary conveyance devices 62, 64 travel, when the motor for traveling 9 of the auxiliary conveyance device 63a is driven. Additionally, the turning tables 6 of the auxiliary conveyance devices 62, 64 turn, when the motor for turning 8 of the main conveyance device 61a is driven.

That is, in the conveyance unit 70, when the motor for turning 8 is driven, all the turning table 6 of the main conveyance device 61a, and the auxiliary conveyance devices 62, 63a, 64 similarly turn at the same time. Additionally, in the conveyance unit 70, when the motor for traveling 9 is driven, all the belts 2 (contact members, endless members) of the main conveyance device 61a, and the auxiliary conveyance devices 62, 63a, 64 similarly travel at the same time.

The conveyance units 34, 60, 70 as a planar conveyance apparatus are used in the following manner.

Figure 22:
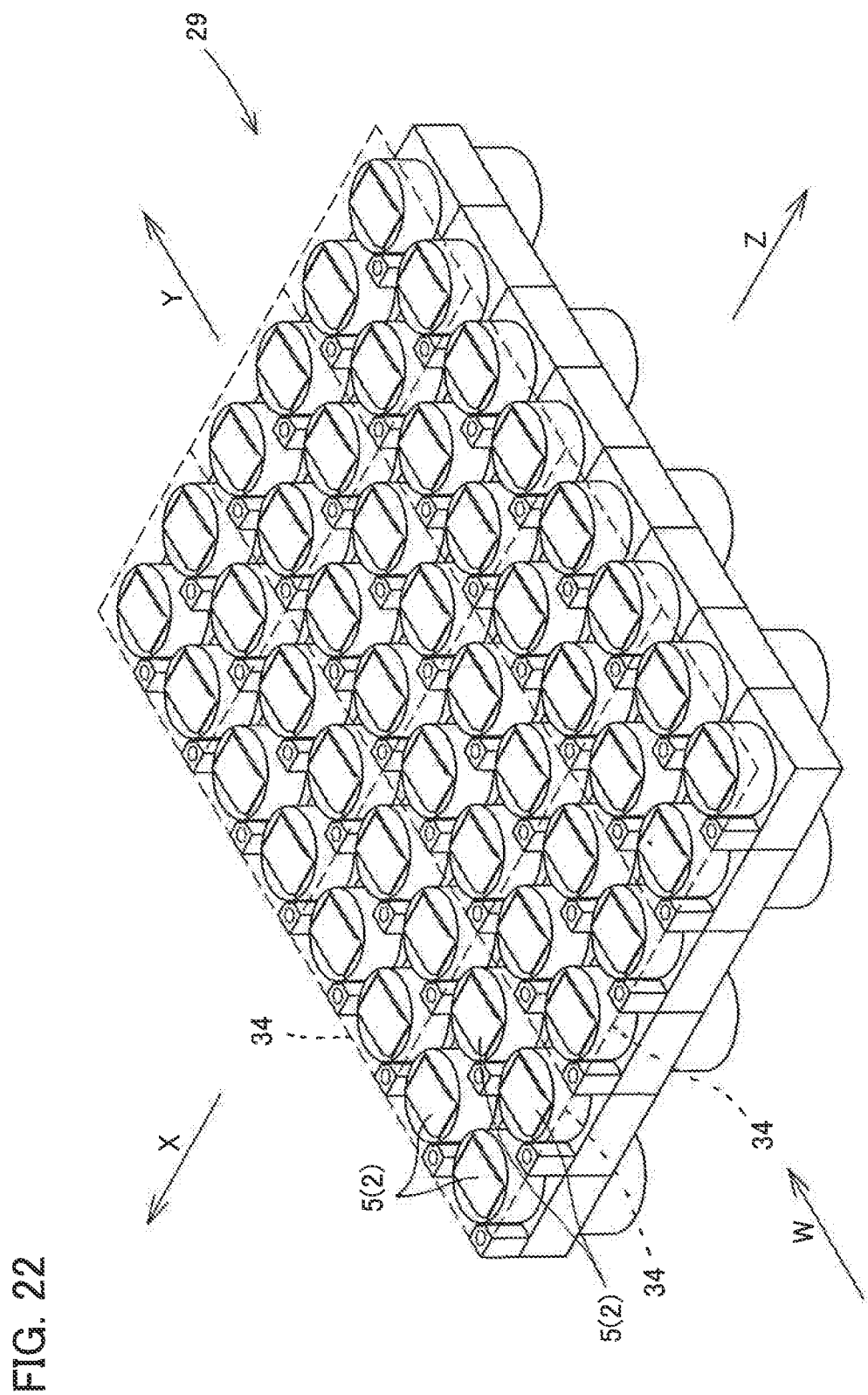
FIG. 22 is a perspective view illustrating a state where a large number of the planar conveyance apparatuses illustrated in FIG. 11 are disposed vertically and horizontally.

That is, as illustrated in FIG. 22, each of the conveyance units 34, 60, 70 has four travel parts 5 (belts 2) surrounded by the broken lines. These conveyance units 34, 60, 70 are disposed vertically and horizontally, so that the sorting region 29 of a conveyor apparatus (not illustrated) is composed.

Figure 23:
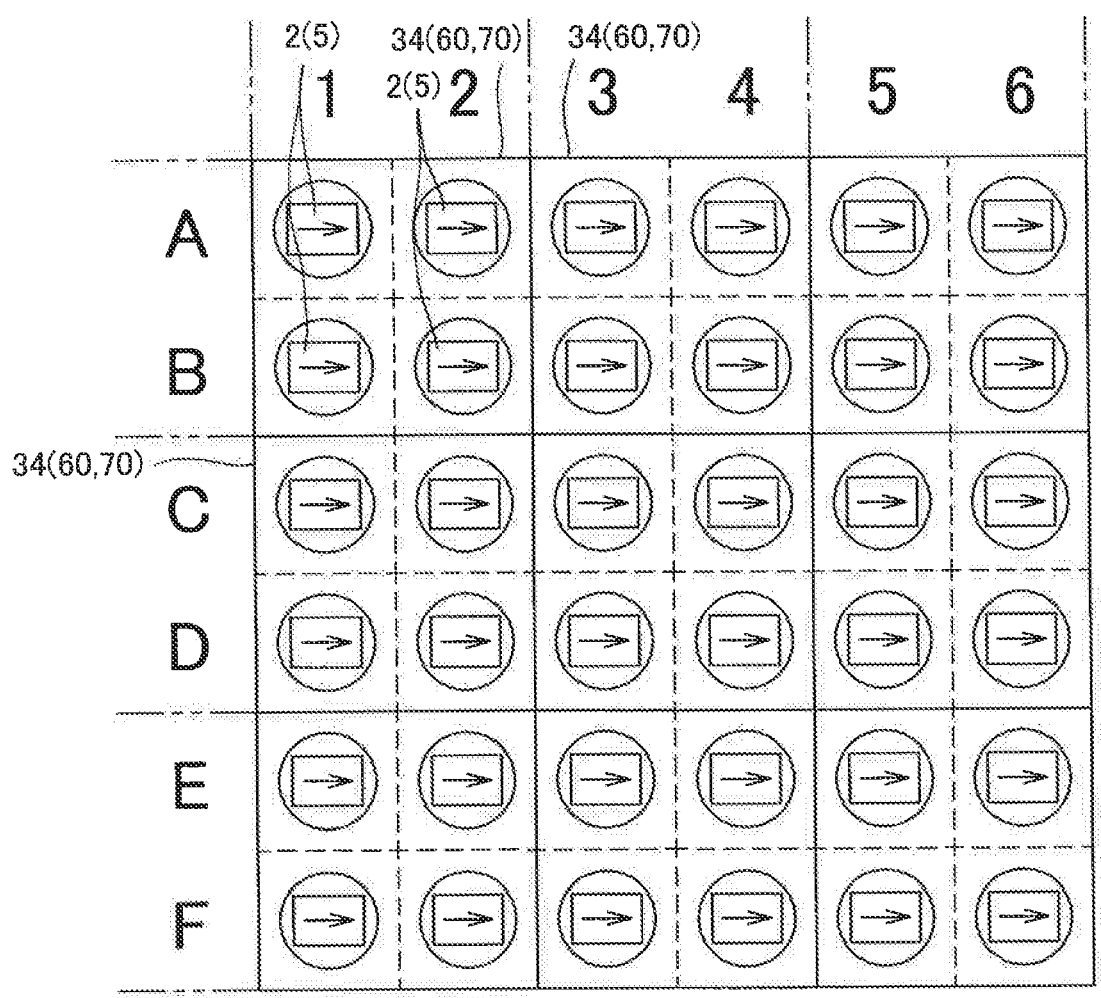
FIG. 23 is a plan view illustrating a state where a large number of the planar conveyance apparatuses illustrated in FIG. 11 are disposed vertically and horizontally.

That is, in FIG. 23, four travel parts 5 (belts 2) surrounded by solid lines belong to one conveyance unit 34, 60 or 70. As illustrated in FIG. 23, the conveyance unit 34, 60 or 70 has, for example, four travel parts 5 (belts 2) of an A row and 1st column, an A row and 2nd column, a B row and 1st column, and a B row and 2nd column. As described above, the four travel parts 5 are driven by the one motor for turning 8 to turn at the same time and at the similar manner, and are driven by the one motor for traveling 9 to travel at the same speed and at the same time. Therefore, all the travel parts 5 and all the turning tables 6 can be driven by one fourth of the motors for turning 8 and one forth of the motors for traveling 9 in the sorting region 29 illustrated in FIG. 9.

Figure 24:
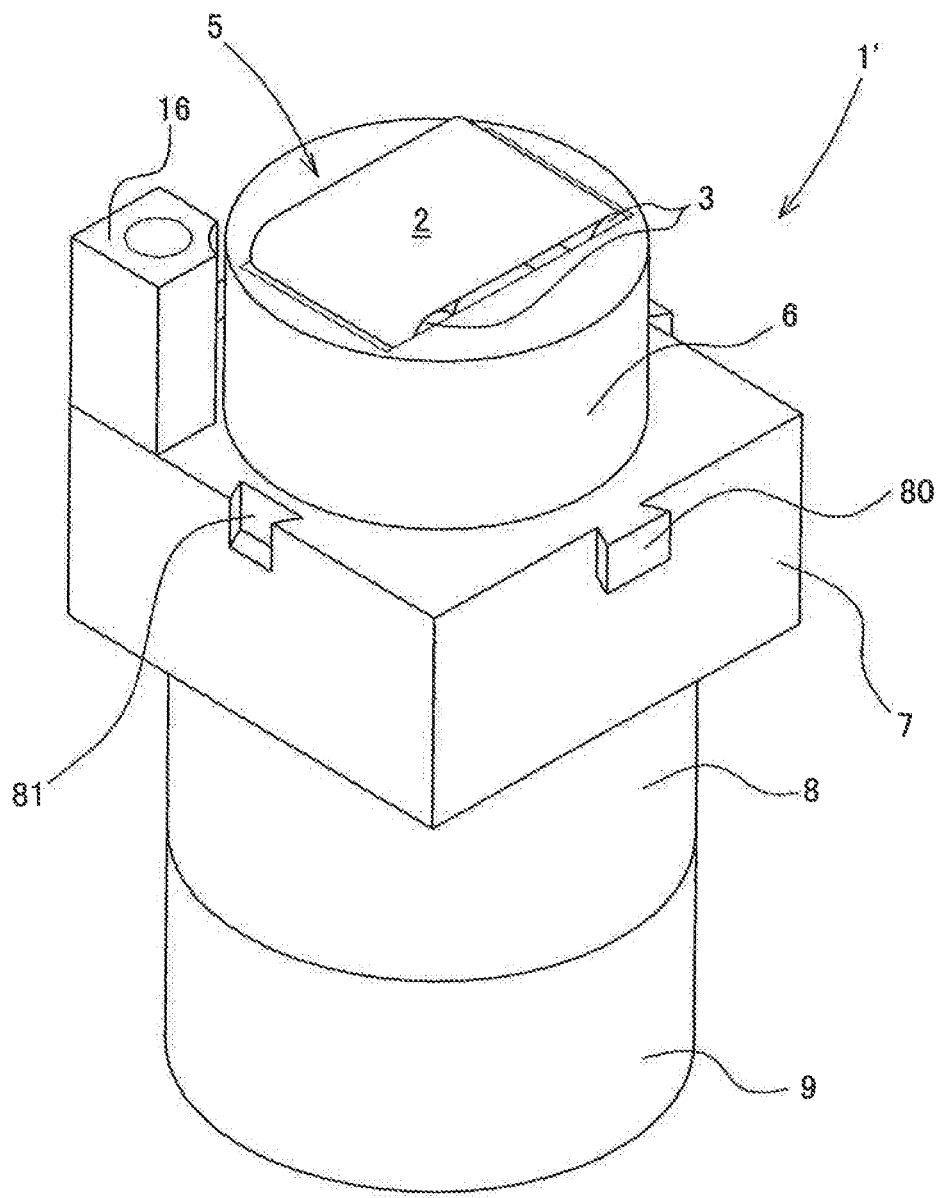
FIG. 24 is a perspective view of a conveyance device of another embodiment of the present invention.
Figure 25:
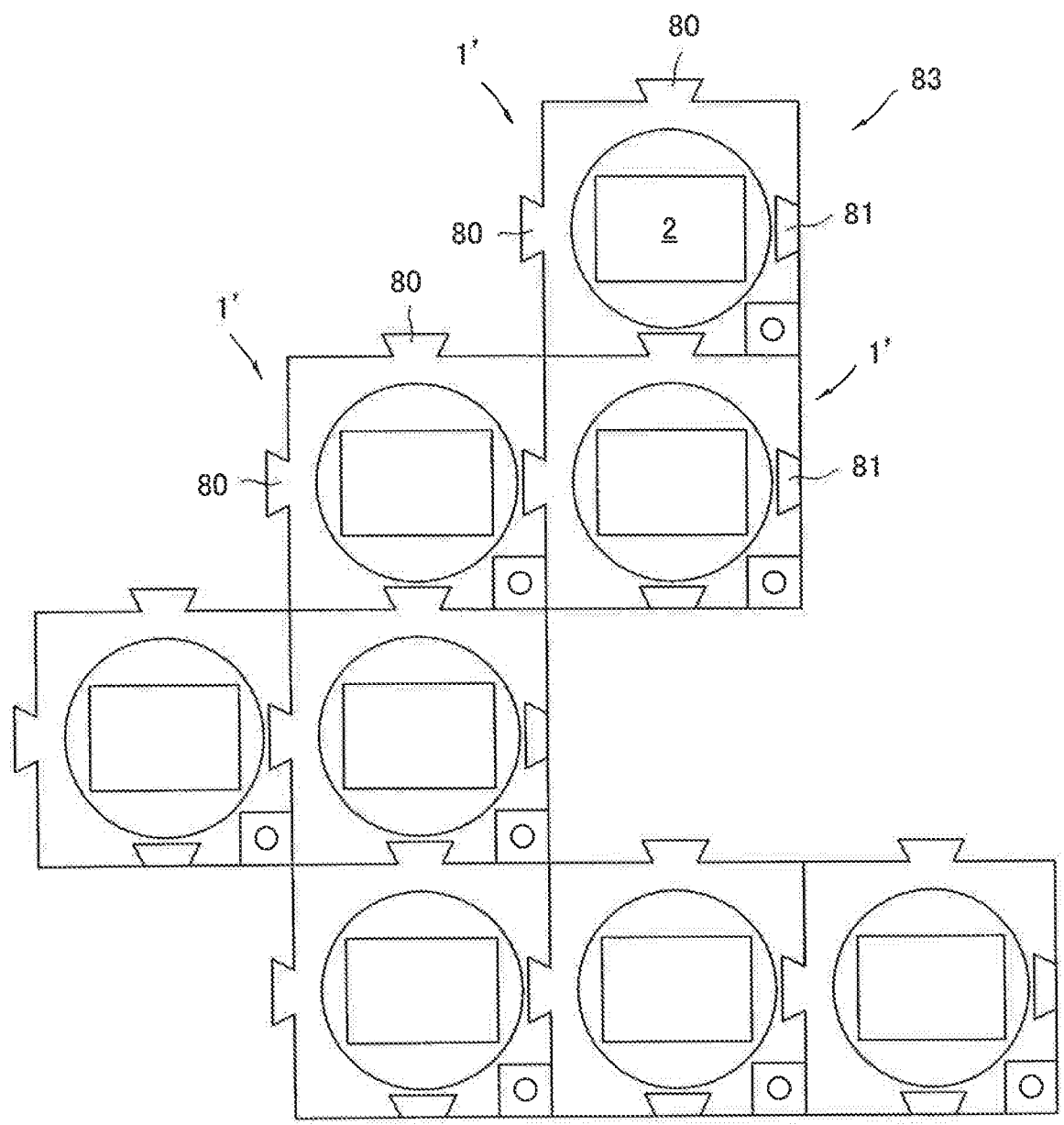
FIG. 25 is a plan view of a planar conveyance apparatus composed of the conveyance devices illustrated in FIG. 24.

Now, a modification of the conveyance device will be described. A conveyance device 1' illustrated in FIG. 24 is a conveyance device obtained by improving the conveyance device 1 in FIG. 1. That is, the conveyance device 1' illustrated in FIG. 24 includes engaging parts 80, 81 that are engaged with other conveyance device 1. In this embodiment, the engaging parts 80, 81 are provided on side surfaces of a housing 7. The one engaging part 80 has a projecting shape, and the other engaging part 81 has a recess shape. An engaging part 80 of a certain conveyance device 1' is engaged with an engaging part 81 of another conveyance device 1'. According to the conveyance device 1' of this embodiment, the engaging parts 80, 81 are engaged with each other, so that a planar conveyance apparatus 83 illustrated in FIG. 25 can be composed.

In each of the planar conveyance apparatuses and the conveyance units of the embodiments thus described, the conveyance devices are disposed vertically and horizontally. However, the conveyance devices may be disposed in a vertical line or a horizontal line.

In the embodiments thus described, all the travel parts 5 have the belts 2, and an article is moved by causing the belts 2 to travel. The belts 2 described in the embodiments each have a width relatively wider than a circumferential length. However, an endless member having narrower width may be employed as each travel part 5. For example, an endless member whose appearance shape is like an O-ring may be employed as each travel part 5.

Additionally, a plurality of endless members may be suspended in parallel between a pair of rollers or the like.

A rotator such as a short roller and a roller may be brought into contact with an article, in place of the belt 2.

Hereinafter, a conveyance device 85 having a structure in which rotators and an article are brought into contact with each other will be described. Components identical with the components of the conveyance devices of the previous embodiments are denoted by the same reference numeral, and overlapped description will be omitted.

Figure 26:
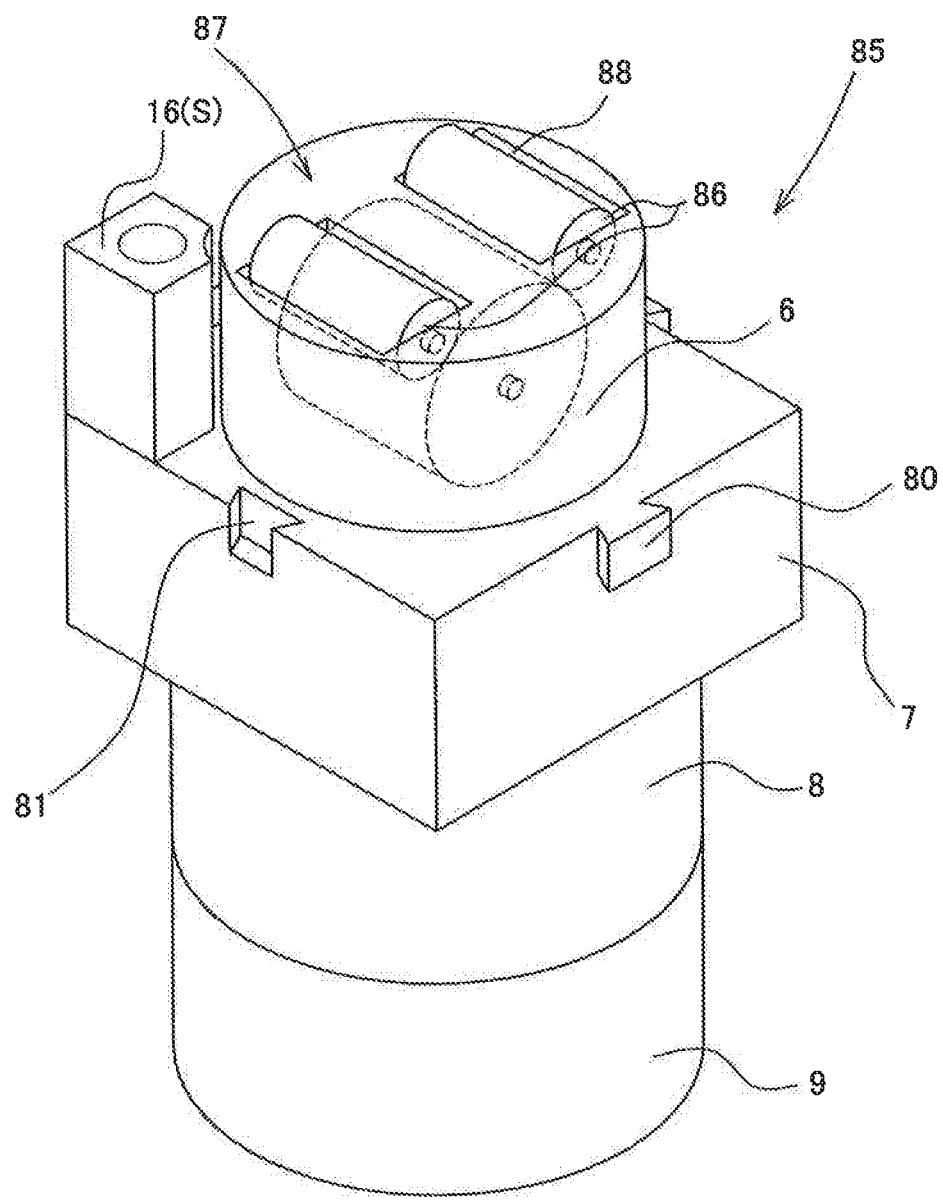
FIG. 26 is a perspective view of a conveyance device according to yet another embodiment of the present invention.

The conveyance device 85 illustrated in FIG. 26 has two conveying rollers 86, and has a structure in which the conveying rollers 86 are rotated to move an article.

Figure 27:
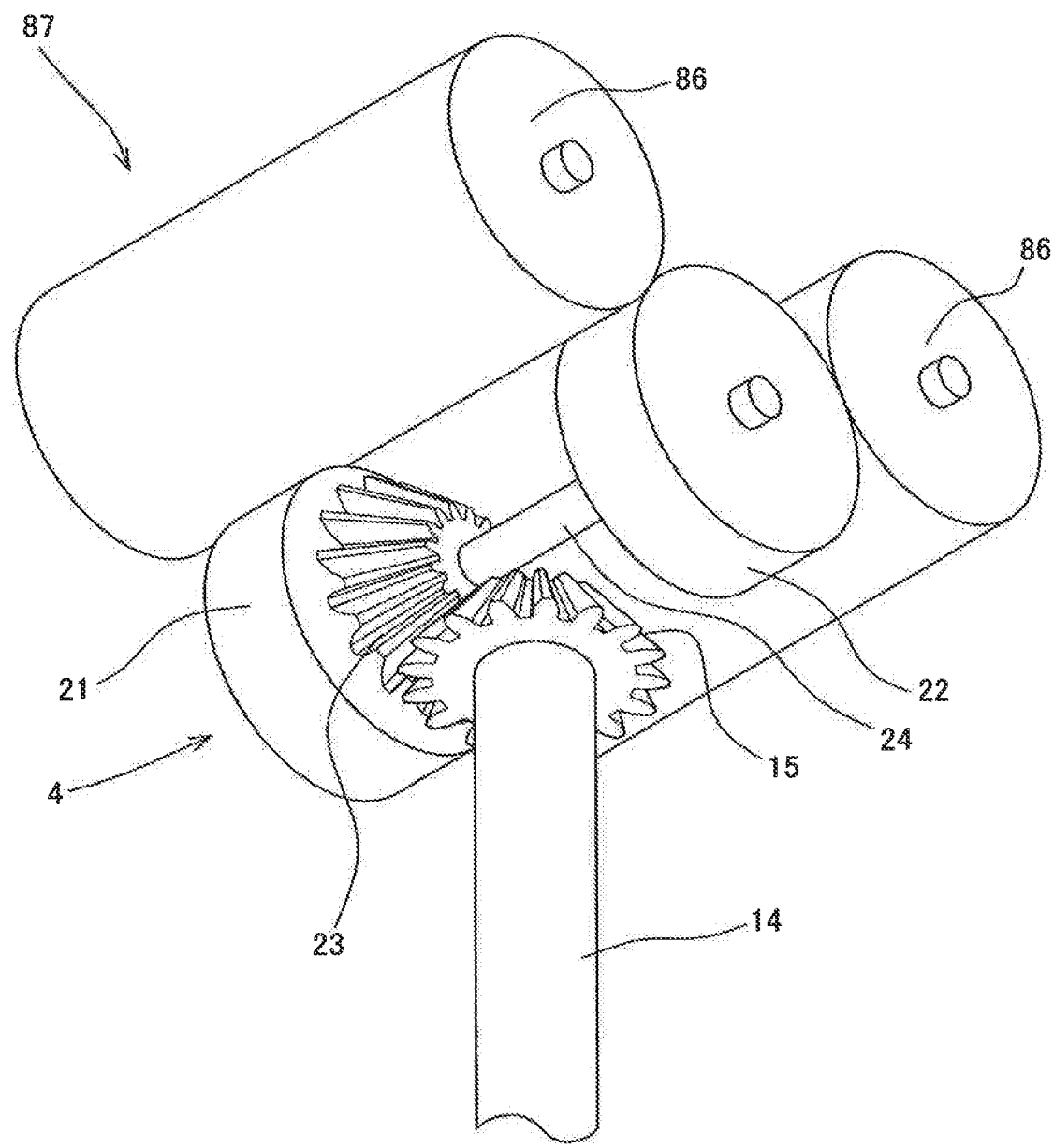
FIG. 27 is a partial perspective view of a belt drive part in the conveyance device in FIG. 26 is viewed obliquely from below

A travel part 87 of the conveyance device 85 has the two conveying rollers 86 (rotators), and a driving roller 4 as illustrated in FIG. 27, The driving roller 4 has pressing parts 21, 22, a bevel gear part 23, and a shaft part 24 similarly to those in the previous embodiments, as illustrated in FIG. 27.

In this embodiment, the pressing parts 21, 22 of the driving roller 4 are in direct contact with the two conveying rollers 86. Therefore, the conveying rollers 86 rotate in accordance with rotation of the pressing parts 21, 22. The conveying rollers 86 are partially exposed from rectangular openings 88 as illustrated in FIG. 26, and can come into contact with an article to move the article.

Figure 28:
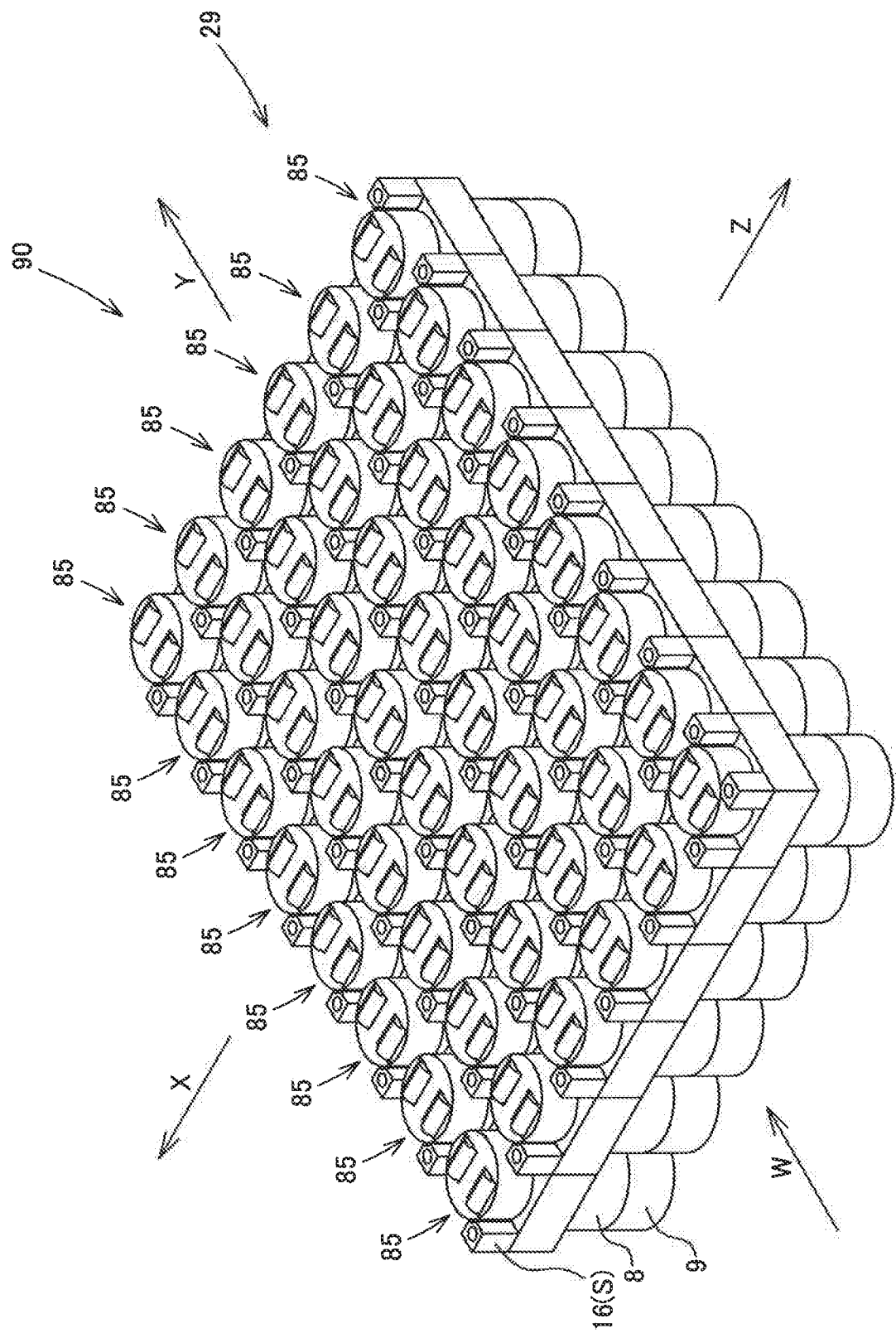
FIG. 28 is a perspective view of a planar conveyance apparatus configured by vertically and horizontally disposing a large number of the conveyance devices in FIG. 26.
Figure 29:
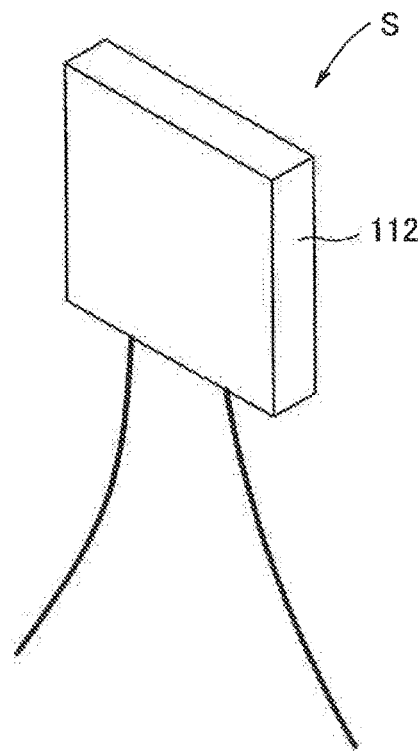
FIG. 29 is a perspective view of a load presence sensor employed in the planar conveyance apparatus.

Similar to the previous embodiments, a planar conveyance apparatus 90 illustrated in FIG. 28 can be configured by use of the conveyance device 85.

A configuration of the travel part 87 illustrated in FIG. 27 can be employed as the travel part of each of the conveyance devices of all the above embodiments.

In the configuration illustrated in FIG. 27, the two conveying rollers 86 are provided. However, the number of conveying rollers is arbitrary, and one or three or more may be employed.

In a case where one conveying roller is employed, the driving roller 4 in FIG. 27 may be directly exposed to the outside, and be used as a conveying roller.

In each of the above embodiments, the output gear 12 is integrally fixed to the motor for turning 8 (FIG. 3), and the output gear 12 rotates integrally with the output shaft 10. The output gear 12 is engaged with the engaging part 18 (internal teeth) of the turning table 6 through the small gears 13. Therefore, turning force of the motor for turning 8 is decelerated by gear trains to be transmitted to the turning table 6.

Figure 6:
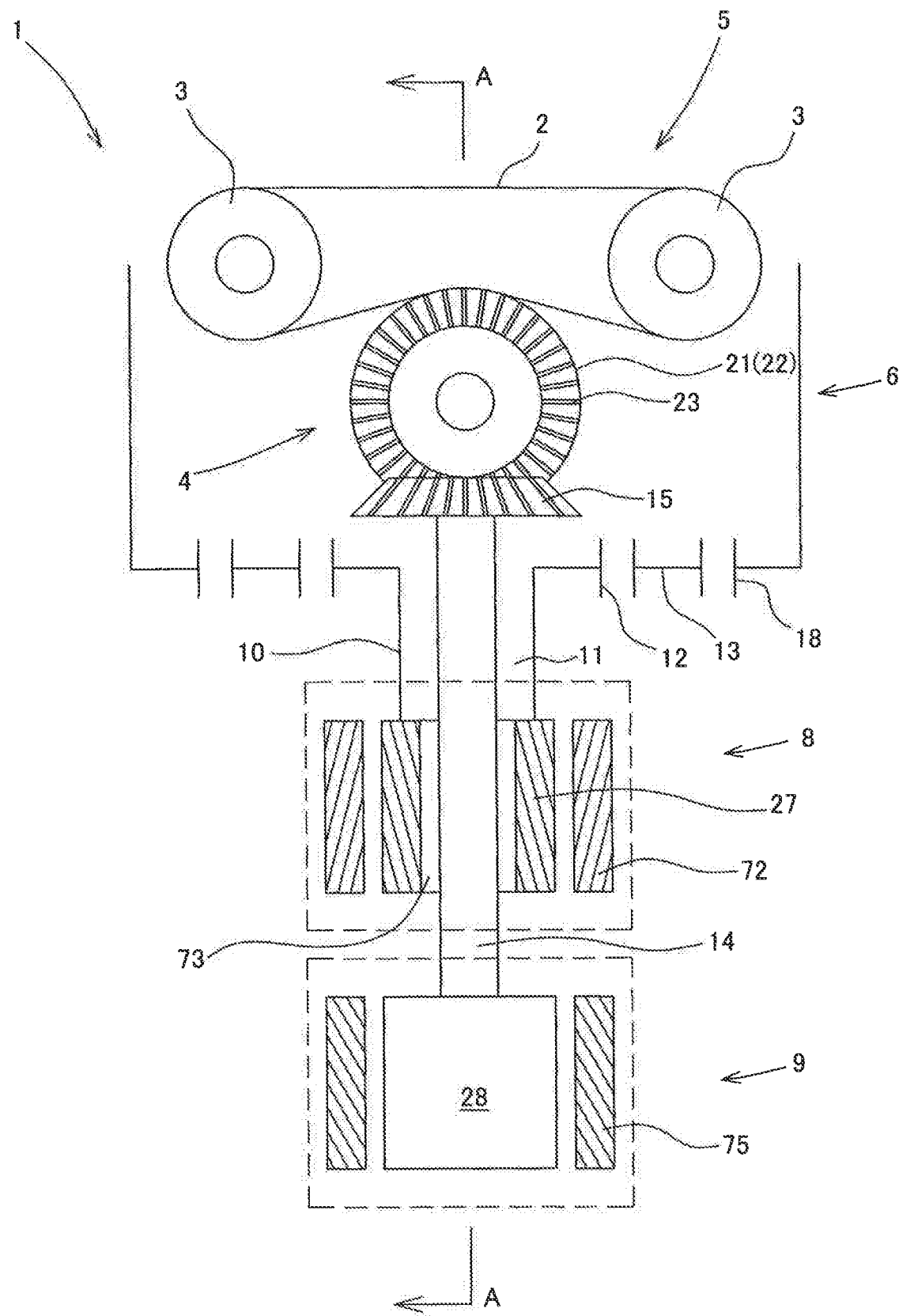
FIG. 6 is a skeleton view illustrating a power system of the conveyance device in FIG. 1.
Figure 7:
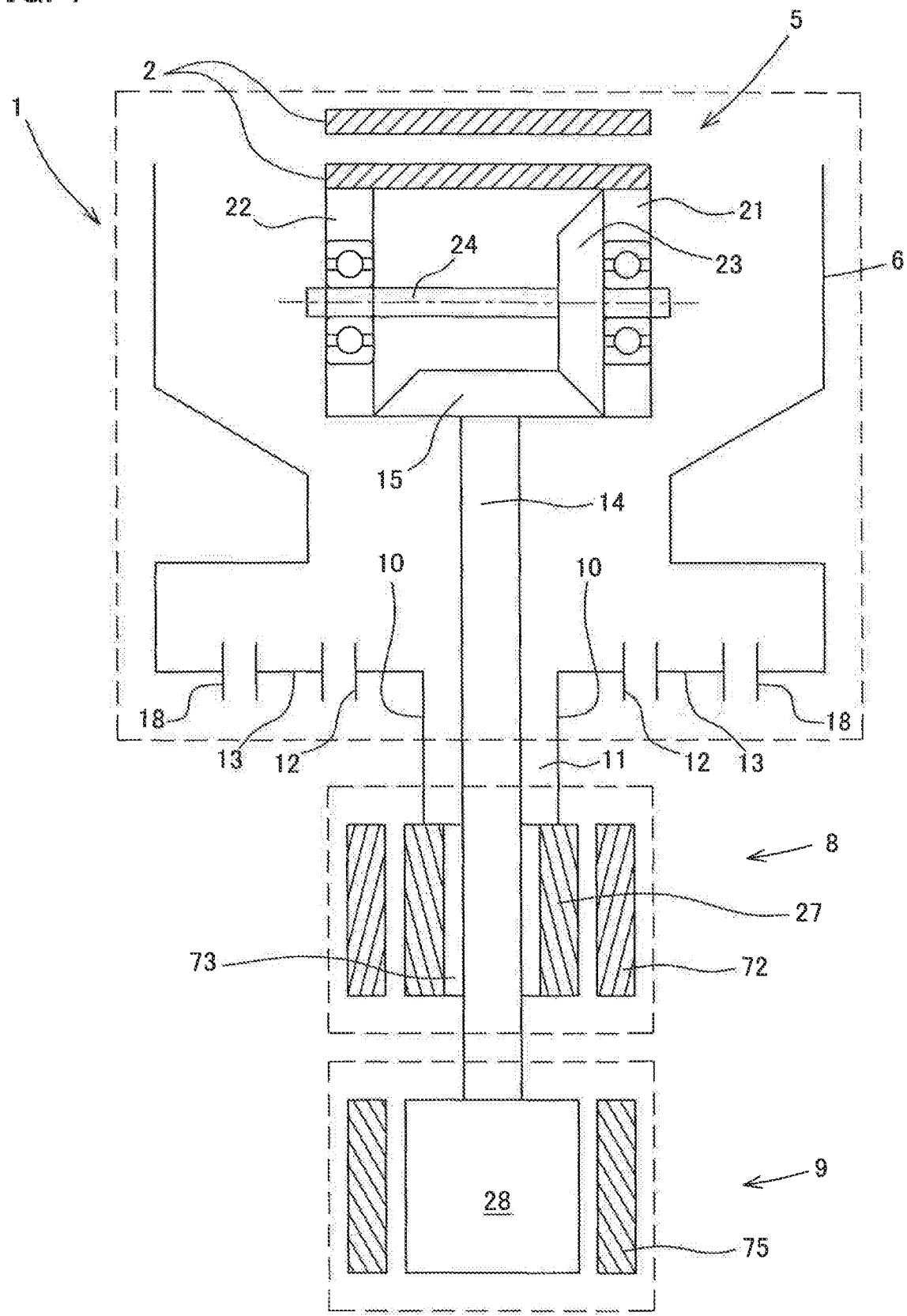
FIG. 7 is a view viewed along arrows A-A in FIG. 6.

However, in these gear trains illustrated in FIGS. 6 and 7, a reduction ratio is not sometimes enough.

Figure 32:
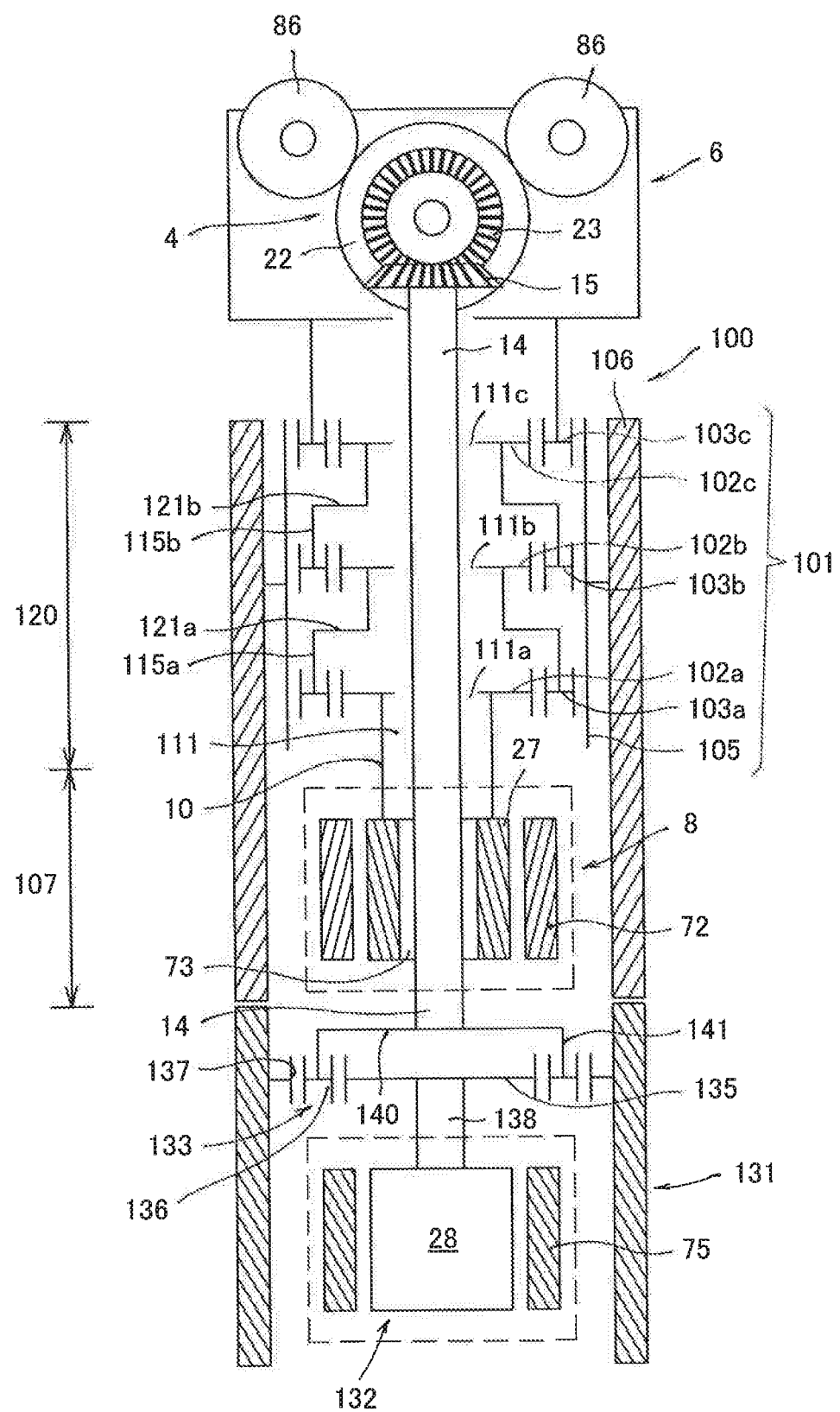
FIG. 32 is a skeleton view illustrating a power system of a conveyance device of another embodiment of the present invention.

On the other hand, a conveyance device 100 illustrated in FIG. 32 has a speed reduction mechanism 101 that exhibits a larger reduction ratio.

The speed reduction mechanism 101 employed in the conveyance device 100 is incorporated in an enclosure member 106 common to a motor for turning 8. It can be said that the motor for turning 8 employed in the conveyance device 100 is a sort of a geared motor.

The speed reduction mechanism 101 employed in the conveyance device 100 is multi-stage (three-stage in the embodiment) planet gear trains.

The planet gear train of each stage is composed of a single sun gear 102, four planet gears 103, and an internal gear 105 common to each stage.

The enclosure member 106 is cylindrical, and the inside thereof is divided into a motor part 107 and a speed reducer part 120.

Figure 3:
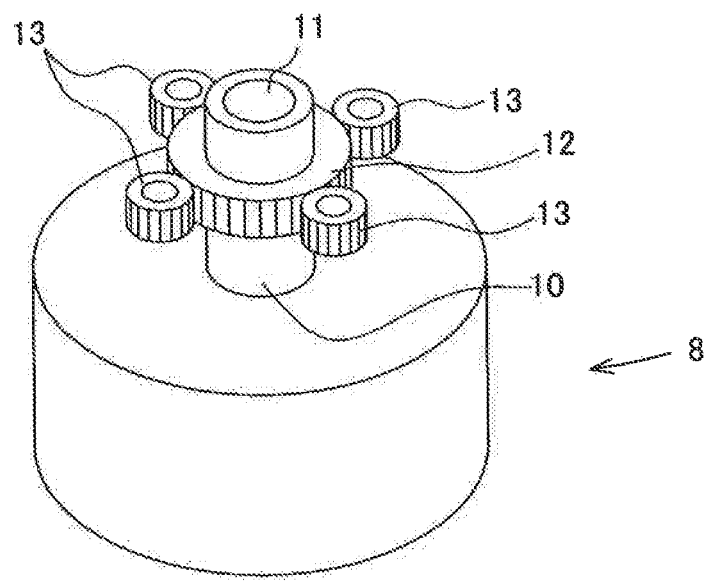
FIG. 3 is an exploded perspective view of a motor for turning and a motor for traveling of the conveyance device in FIG. 1
Figure 3:
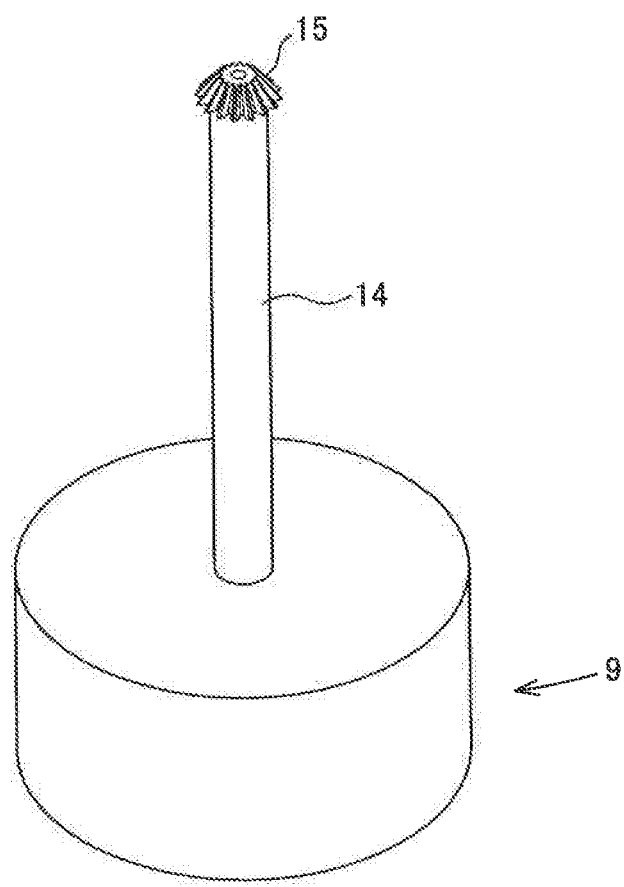

Inside the motor part 107, the motor for turning 8 has a stator 72 and a rotor 27 similarly to the motor for turning 8 of FIGS. 3, 6 and 7, and an output shaft 10 is connected to the rotor 27. The rotor 27 of the motor for turning 8 is cylindrical, and a through hole 73 is formed inside the rotor.

Additionally, the output shaft 10 is connected to a sun gear 102a of a first stage. Also inside the sun gear 102a, a through hole 111a is provided. The through hole 73 provided in the rotor 27, and the through hole 111 provided in the output shaft 10 are communicated with each other, and a drive shaft 14 of a motor for traveling 9 passes through the through hole 111.

In the speed reducer part 120 of the enclosure member 106, the internal gear 105 is integrally provided. The internal gear 105 has a long whole length (tooth width), and is disposed over the whole length of the three-stage planet gear trains.

As illustrated above, the speed reducer part 120 incorporates the three-stage planet gear trains therein.

A planet gear train of the first stage is composed of the above first sun gear 102a connected to the rotor 27 of the above motor part 107, the internal gear 105, and the four planet gears 103a engaged with the both.

Figure 33:
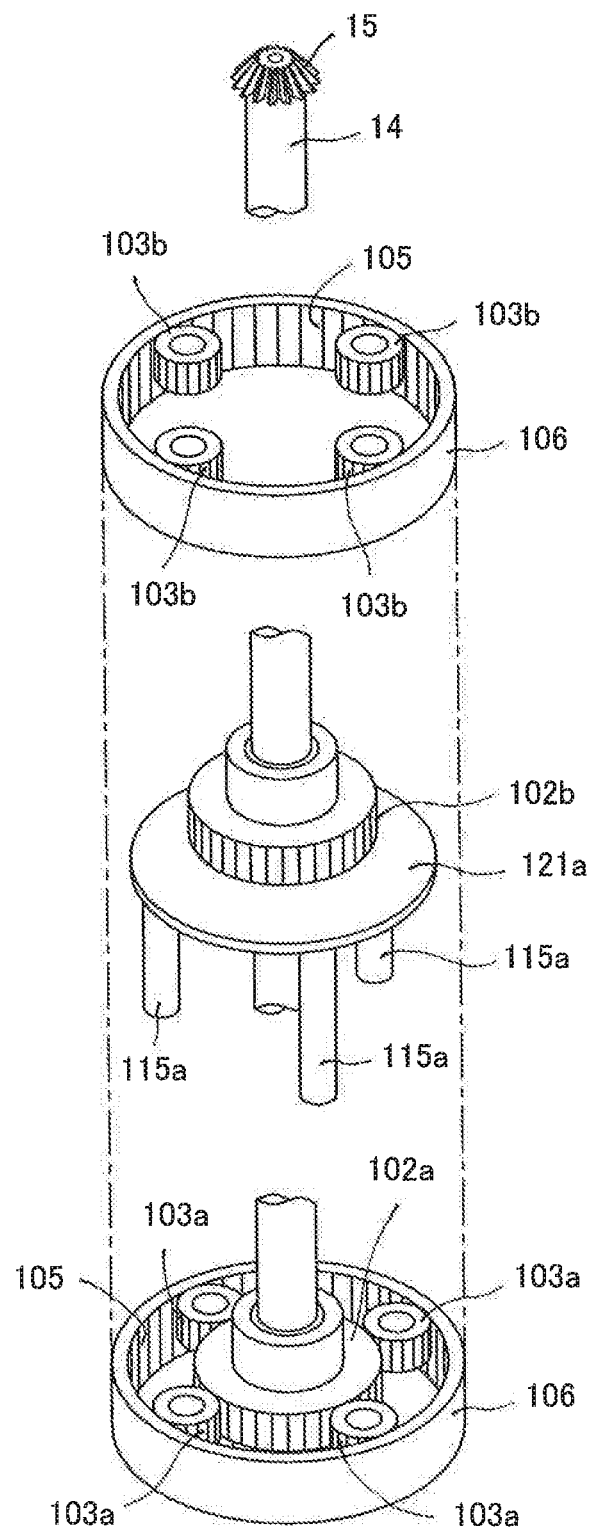
FIG. 33 is a perspective view illustrating a part of a speed reduction mechanism of the conveyance device in FIG. 32.

As illustrated in FIGS. 32 and 33, pins 115a of the arm member 121a are inserted into the respective planet gears 103a.

In the planet gear train of the first stage, the first sun gear 102a rotates, so that the four planet gears 103a revolve around the first sun gear 102a, and the arm member 121a rotates.

Additionally, a second sun gear 102b is integrated with the arm member 121a. A through hole 111b is provided also in the second sun gear 102b, and the drive shaft 14 of the motor for traveling 9 passes through the through hole 111b.

A planet gear train of the second stage is composed of the above second sun gear 102b, the internal gear 105, and the four planet gears 103b engaged with both the above gears.

As illustrated in FIG. 32, pins 115b of the arm member 121b are inserted into the respective planet gears 103b.

In the planet gear train of the second stage, the second sun gear 102b rotates, so that the four planet gears 103b revolve around the second sun gear 102b, and the arm member 121b rotates. Additionally, the third sun gear 102c is integrated with the arm member 121b. A through hole 111c is provided also in the third sun gear 102c, and the drive shaft 14 of the motor for traveling 131 passes through the through hole 111c.

A planet gear train of the third stage is composed of the above third sun gear 102c, the internal gear 105, and the four planet gears 103c engaged with both the above gears.

The four planet gears 103c of the planet gear train of the third stage are connected to a turning table 6. Therefore, when the motor part 107 is rotated, the rotation is deaccelerated by the speed reducer part 120, and the turning table 6 turns.

A configuration of the inside of the turning table 6 is similar to the configuration of the inside of the conveyance device 85 illustrated in FIG. 27, and the turning table 6 has two conveying rollers 86 (rotators), and a driving roller 4. A structure of the driving roller 4 is the same as the structure of the driving roller of each of the previous embodiments, has pressing parts 21, 22, a bevel gear part 23, and a shaft part 24, as illustrated in FIG. 27, and the pressing parts 21, 22 of the driving roller 4 are in direct contact with the two conveying rollers 86.

Also in the conveyance device 100, the motor for traveling 131 is disposed in a lower part of the motor for turning 8. The motor for traveling 131 is a geared motor, and is a motor obtained by integrating a motor part 132 with a speed reduction mechanism 133. The motor part 132 has a stator 75, and a rotor 28.

The speed reduction mechanism 133 is a single-stage planet gear train, and is composed of a single sun gear 135, three planet gears 136, an internal gear 137, and an arm member 140.

An output shaft 138 of the motor part 132 is connected to the sun gear 135. Additionally, the three planet gears 136 are engaged with both the sun gear 135 and the internal gear 137.

Pins 141 of the arm members 140 are inserted into the respective planet gears 136.

Additionally, the drive shaft 14 is connected to the arm member 140.

In the embodiment thus described, the motor for turning 8 and the motor for traveling 9 are located at overlapped positions, and the upper side is the motor for turning 8, and the lower side is the motor for traveling 9. Additionally, the motor for turning 8 and the motor for traveling 9 are disposed on the same axis.

The motor for turning 8 disposed on the upper side has the through hole 73, and the drive shaft 14 (drive shaft) is inserted into the through hole 73.

However, the present invention is not limited to this configuration, and the overlapped state of the motor for turning 8 and the motor for traveling 9 may be opposite. That is, the motor for traveling 9 may be disposed on the upper side, and the motor for turning 8 may be disposed on the lower side. In a case where this configuration is employed, a through hole is provided in the motor for traveling 9 on the upper side, and the drive shaft is inserted into the through hole of the motor for traveling 9. Additionally, the drive shaft is engaged with the motor for turning 8 on the lower side, thereby causing a turning table 6 to turn.

In the above embodiment, the motor for turning 8 and the motor for traveling 9 are disposed on the same axis. However, the axes of the both may be deviated.

Furthermore, the motor for turning 8 or the motor for traveling 9 each may be in an inclined posture, or may be in a horizontal posture. Furthermore, the motor for turning 8 and the motor for traveling 9 may not be overlapped with each other.

Now, a recommended sensor 16 will be described.

In the planar conveyance apparatus 90, a characteristic load presence sensor S is used. The load presence sensor S has a quadrangular shape having one side of 5 mm to 40 mm, more preferably about 10 mm to 25 mm, and is a solar cell 112 having a thickness of about 2 mm to 5 mm. More precisely, in the load presence sensor S, the solar cell 112 is used as a detection part.

Herein, the solar cell is a crystalline solar cell or a thin film solar cell, and receives visible light to generate electricity. The solar cell is thin plate-like. The solar cell is a solar cell obtained by laminating a semiconductor film on a thin semiconductor substrate or an insulated substrate.

The above sensor substrate 123 is a substrate formed with an electronic circuit 113 that outputs an ON/OFF signal based on a signal of the load presence sensor S.

Figure 30:
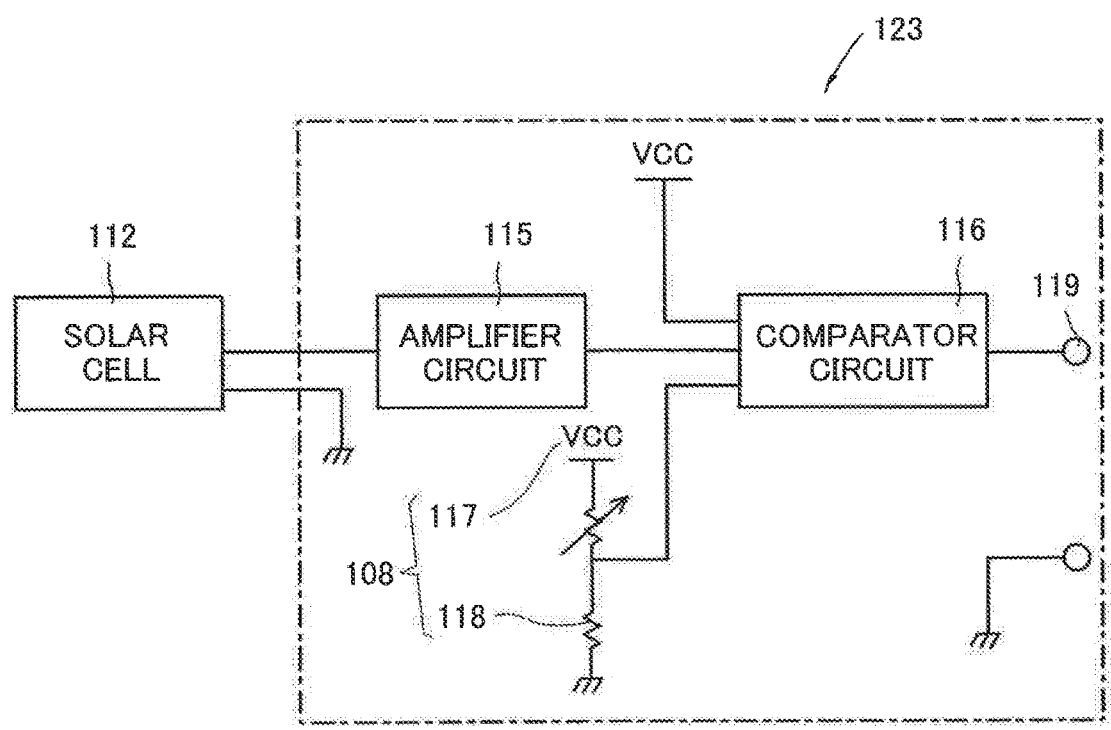
FIG. 30 is a circuit diagram of the load presence sensor.

The circuit of the sensor substrate 123 is illustrated in FIG. 30, and has an amplifier circuit 115, a comparator circuit 116, and a threshold value changing circuit (threshold value changing means) 108.

The amplifier circuit 115 is specifically an operational amplifier, and the comparator circuit 116 is a comparator.

The threshold value changing circuit 108 is a voltage divider composed of a variable resistor 117 and a fixed resistor 118.

The solar cell 112 is connected to the sensor substrate 123. Output of the solar cell 112 is input to the amplifier circuit 115 of the sensor substrate 123, a signal amplified by the amplifier circuit 115 is input to the comparator circuit 116, and output of the comparator circuit 116 is output from an output terminal 119 to the outside.

On the other hand, the threshold value changing circuit 108 reduces a positive power supply voltage (VCC) to generate and adjust a reference voltage as a threshold value. Furthermore, the reference voltage as the threshold value is input to the comparator circuit 116.

Then, a voltage of the solar cell 112, amplified by the amplifier circuit 115 is compared with the reference voltage which is input from the threshold value changing circuit 108 to the comparator circuit 116. In this embodiment, in a case where a voltage coming from the solar cell 112 is higher than the reference voltage, an OFF signal is output from the comparator circuit 116. In a case where the voltage coming from the solar cell 112 is lower than the reference voltage, an ON signal is output from the comparator circuit 116.

In this embodiment, the load presence sensors S are mounted in the individual conveyance devices 85. The load presence sensors S are each horizontally installed with the solar cell 112 side upward. Therefore, the solar cells 112 can receive light of an indoor illumination (not illustrated) as illustrated in FIG. 31.

Then, an article 130 does not exist on the load presence sensors S as illustrated in FIG. 31, the solar cell 112 directly receives light of the indoor illumination (not illustrated), and generates a relatively high voltage. Therefore, the voltage coming from the solar cell 112 becomes higher than the reference voltage, and an OFF signal is output from the comparator circuit 116.

On the other hand, in a case where the article 130 exists on the load presence sensor S, the light from the indoor illumination (not illustrated) is blocked, and the solar cells 112 are shaded by the article 130. Therefore, a voltage generated by each solar cell 112 is lowered, the voltage originating in each solar cell 112 becomes lower than the reference voltage, and an ON signal is output from the comparator circuit 116.

Figure 31A:
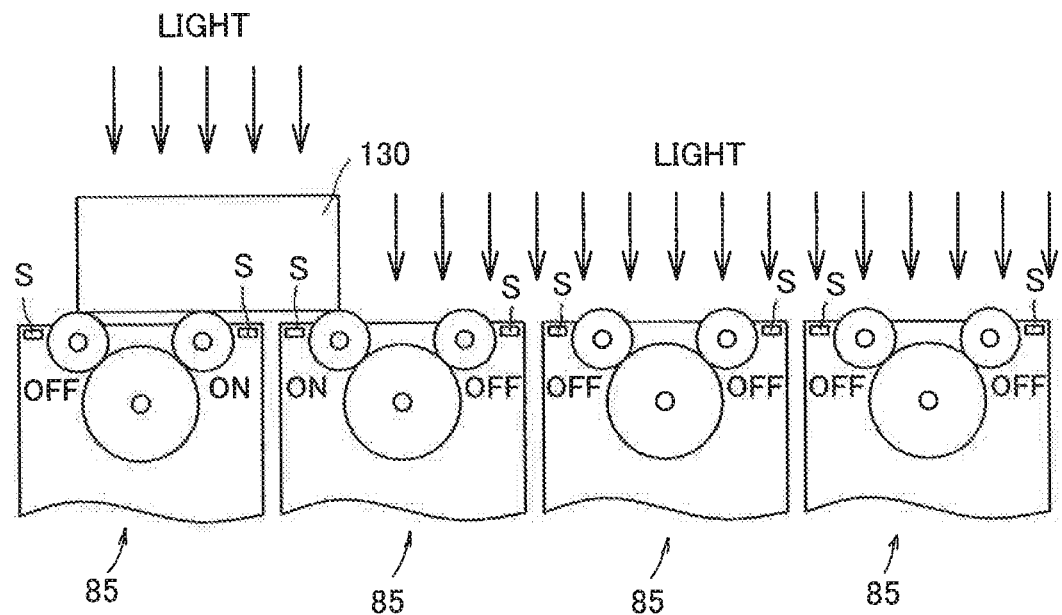
FIGS. 31A and 31B are each an explanatory diagram for illustrating relation between an article on the planar conveyance apparatus, and a sensor.
Figure 31B:
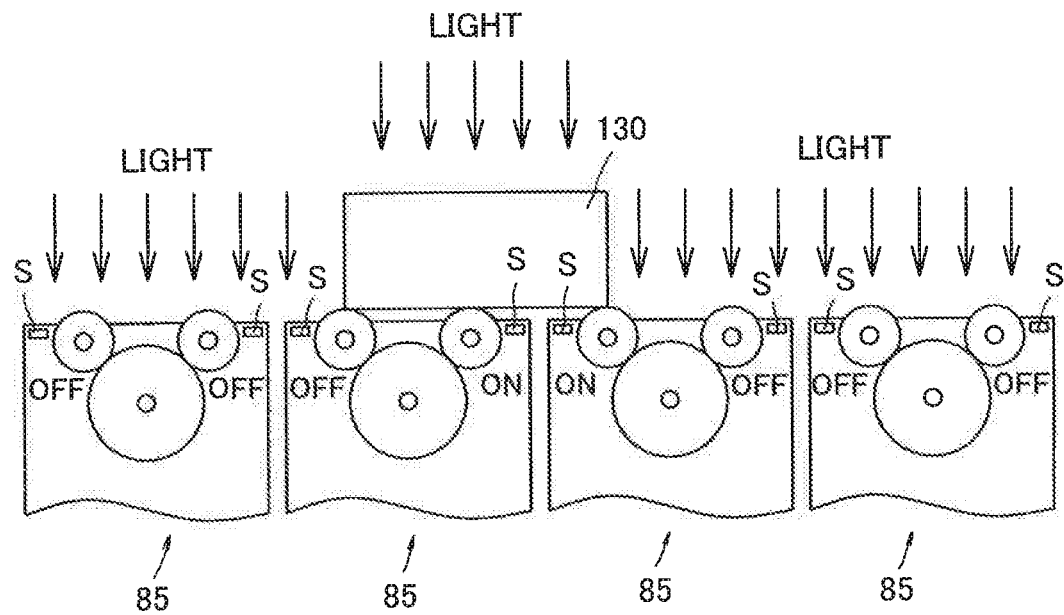

Therefore, when the article 130 moves from a position of FIG. 31A to a position of FIG. 31B, ON/OFF states of the load presence sensors S are changed, and it is possible to detect the position of the article 130.

Now, an example of use of the above planar conveyance apparatus 90 will be described. A similar function can be exhibited in the planar conveyance apparatus 71.

Figure 34A:
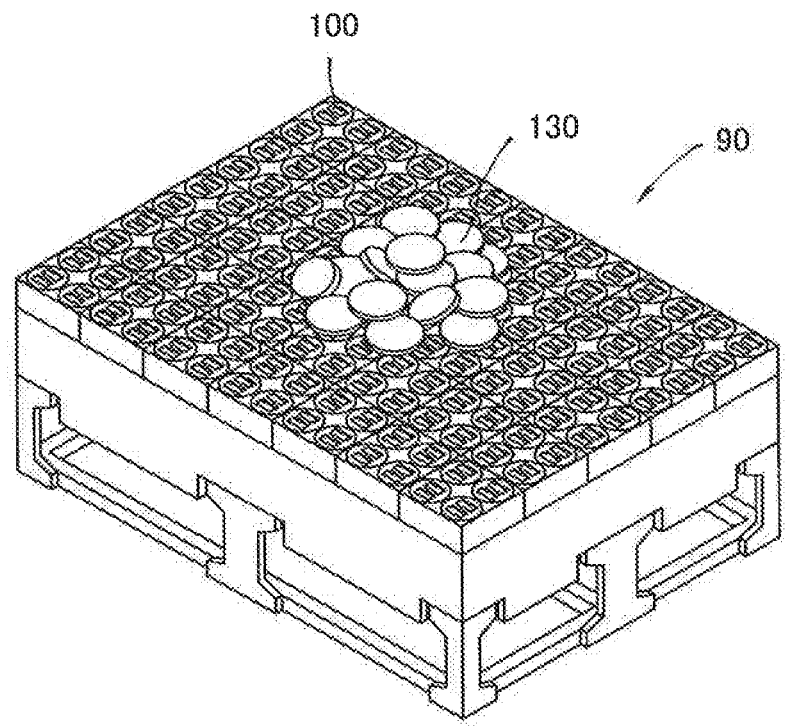
FIG. 34A is a perspective view for illustrating one operation of the planar conveyance apparatus.
Figure 34B:
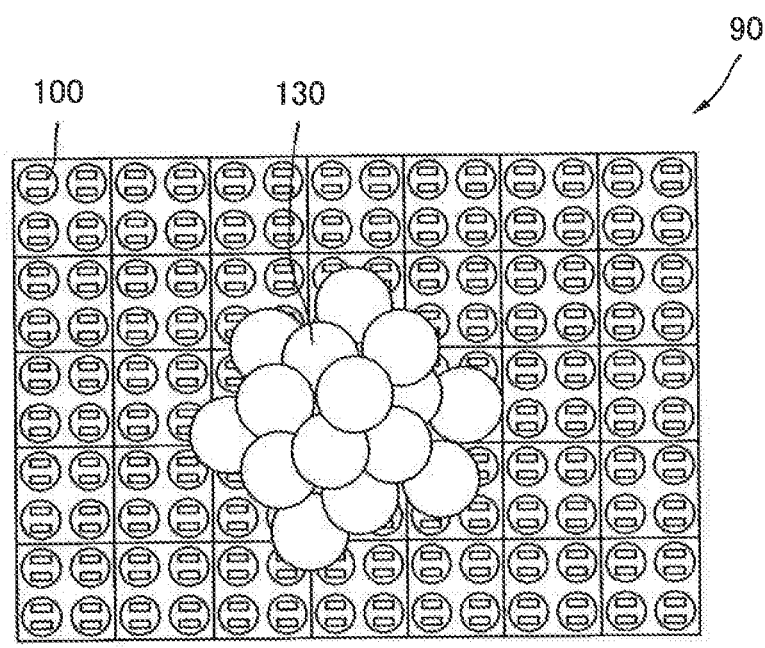
FIG. 34B is a plan view thereof.
Figure 35A:
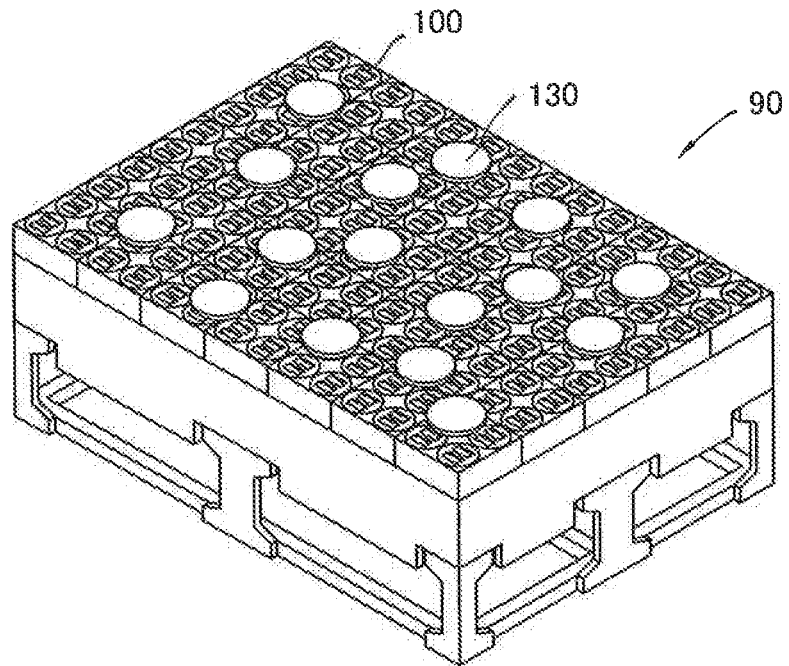
FIG. 35A is a perspective view for illustrating a state subsequent to the operation in FIG. 34, which is one operation of the planar conveyance apparatus.
Figure 35B:
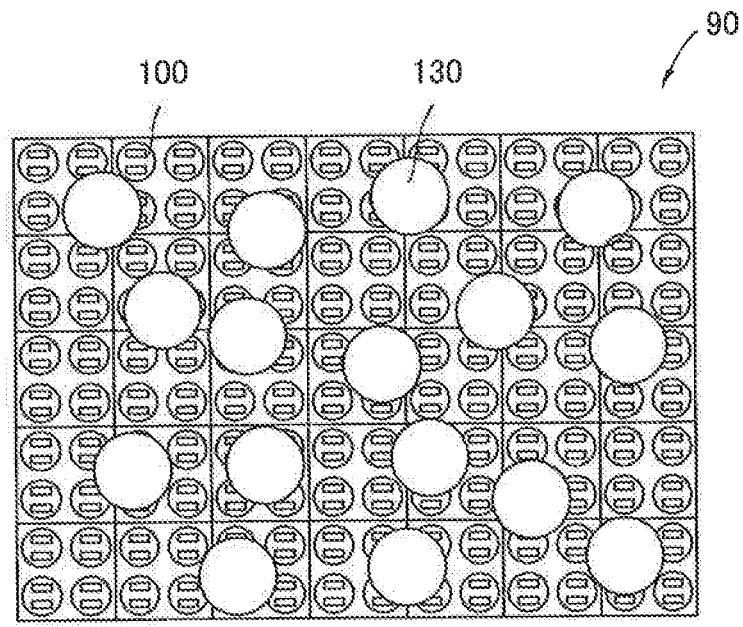
FIG. 35B is a plan view thereof.

The planar conveyance apparatus 90 includes the sensors 16 (not illustrated in FIGS. 34 and 35). The sensors 16 each are, for example, a bar code reader, and can identify an object to be conveyed. The sensors 16 each are an information acquiring means for acquiring information from an object to be conveyed. Additionally, one conveyance cell of the planar conveyance apparatus 71 has individually a motor for turning 8, and a motor for traveling 9 like the conveyance device 1 illustrated in FIGS. 1, 6 and 7, and the conveyance device 100 illustrated in FIG. 32. In FIG. 34, the conveyance devices 100 are used as the conveyance cells.

The planar conveyance apparatus 90 can be used for application of sorting miscellaneous objects to be conveyed. For example, unsold products are returned, and are sometimes housed in a predetermined shelf or box to be stored as stocks.

For example, in a case of a hook, unsold books are returned from respective retail bookstores, and the books returned from the respective bookstores are various and a small amount.

A publisher of the books classifies the books to house the books in a predetermined shelf or the like.

In the planar conveyance apparatus 90 of this embodiment, returned various objects (object to be conveyed) 130 are put on the planar conveyance apparatus 90 as illustrated in FIG. 34. Objects to be conveyed are put in an overlapped massive state, and swell in a mountain shape as illustrated in FIG. 34.

In the planar conveyance apparatus 90 of this embodiment, the respective turning tables 6 of the conveyance devices (conveyance cells) 100 are driven, and a mountain of the objects to be conveyed is collapsed toward a direction radially away from the mountain of the objects to be conveyed which are swollen in the conveying directions by the travel part 5, and distribution of the objects to be conveyed is spread.

The objects to be conveyed are spread in a plane shape such that the respective objects to be conveyed are not overlapped with each other as illustrate in FIG. 35. Then, information for identifying the objects to be conveyed is acquired by the sensor 16. Thereafter, the respective conveyance devices 100 are driven, and the objects 130 to be conveyed are moved to desired places.

The information acquiring means for obtaining information from the objects to be conveyed is not limited to the sensor 16 provided in each of the conveyance devices 1, and for example, a camera may be provided in each of the planar conveyance apparatuses 71, 90, and an image photographed by the camera may be analyzed, and information of an object to be conveyed may be acquired.

EXPLANATION OF REFERENCE SIGNS 1, 1', 85, 100: conveyance device
2: belt (contact member, endless member)
3: roller (rotator)
4: driving roller (driving body)
5: travel part
6: turning table
8: motor for turning
9, 131: motor for traveling
10: output shaft (output part of motor for turning)
11: through hole
14: drive shaft (drive shaft)
28: driving motor of motor for traveling (output part)
31: main conveyance device
32, 33: auxiliary conveyance device
34, 60, 70: conveyance device (planar conveyance apparatus, conveyance unit)
35: output gear (engaging member for turning force output)
38: tooth part (turning table connection part)
39: output gear (engaging member for traveling force output)
40: driven gear (engaging member for traveling)
41: gear (engaging member for turning force transmission)
42: gear (engaging member for turning force transmission)
48: gear (engaging member for traveling force transmission)
61: main conveyance device
73: through hole of motor for turning
80, 81: engaging part
71, 90: planar conveyance apparatus
101: speed reduction mechanism

The invention claimed is:
1. A conveyance device comprising:
a travel part moving an article and having a contact member, the contact member coming into contact with the article to rotate or travel;
a turning table supporting the travel part;
a motor for turning comprising:
a through hole axially passing through the motor for turning; and
an output part outputting turning force;

a motor for traveling disposed below the motor for turning; and a drive shaft inserted into the through hole, wherein the motor for traveling rotates the drive shaft, the drive shaft driving the travel part, and wherein the turning table is directly or indirectly engaged with the output part of the motor for turning, the motor for turning the turning table and the travel part.

2. A conveyance device comprising:

a first travel part moving an article and having a contact member, the contact member coming into contact with the article to rotate or travel;

a turning table supporting the first travel part;

a first engaging member;

a motor for traveling;

a drive shaft transmitting power to the first travel part; and a second engaging member mounted on the drive shaft, the second engaging member rotating as one piece with the drive shaft, wherein the motor for traveling rotates the drive shaft, the drive shaft driving the first travel part, and wherein the second engaging member is capable of driving a second travel part of another conveyance device whereas the first engaging member receives power transmission from outside to turn the turning table and the first travel part.

3. A conveyance device comprising:

a travel part moving an article and having a contact member, the contact member coming into contact with the article to rotate or travel;

a turning table supporting the travel part;

a first engaging member having a turning axis and having a through hole axially passing through the first engaging member; and a drive shaft transmitting power to the travel part, the drive shaft having a third engaging member, wherein the drive shaft is inserted into the through hole, wherein the third engaging member receives power transmission from another conveyance device to rotate, and wherein the first engaging member receives power transmission from outside to turn the turning table and the travel part.

4. The conveyance device according to claim 1, wherein the contact member is an endless member, wherein the travel part comprises:

a pair of rotators freely rotating;

the endless member suspended between the rotators; and a driving body receiving power of the drive shaft to rotate, and wherein the driving body is engaged with the endless member between the rotators to cause the endless member to travel.

5. A conveyance device comprising:

a travel part moving an article and having a contact member, the contact member coming into contact with the article to rotate or travel;

a turning table turning while supporting the travel part to thereby change a conveying direction of the article in contact with the contact member; and a drive shaft, wherein the contact member is an endless member, wherein the travel part comprises:

a pair of rotators freely rotating;

the endless member suspended between the rotators; and a driving body receiving power of the drive shaft to rotate, and wherein the driving body is engaged with the endless member between the rotators to cause the endless member to travel.

6. The conveyance device according to claim 1, wherein the conveyance device is a first conveyance device, and further comprising an engaging part on the first conveyance device engaged with an engaging part on another conveyance device, wherein the engaging parts of the one and another conveyance devices are engaged with each other to allow planar connection of the one and another conveyance devices.

7. A conveyance device comprising:

a travel part moving an article and having a contact member, the contact member coming into contact with the article to rotate or travel;

a turning table supporting the travel part;

a motor for turning that turns the turning table and the travel part, the motor for turning having an axis; and a motor for traveling that drives the travel part, the motor for traveling having an axis, wherein the turning table is directly or indirectly engaged with an output part of the motor for turning, wherein the motor for turning and the motor for traveling are located at overlapped positions, wherein the motor axes are coincident.

8. The conveyance device according to claim 7, further comprising a drive shaft, wherein the motor for turning or the motor for traveling disposed on an upper side has a through hole axially passing therethrough, and wherein the drive shaft is engaged with the motor for turning or the motor for traveling disposed on a lower side, the drive shaft being inserted into the through hole to drive the travel part or the turning table.

9. A conveyance device comprising:

a travel part moving an article and having a contact member, the contact member coming into contact with the article to rotate or travel;

a turning table that supports the travel part;

a motor for turning;

a motor for traveling; and a drive shaft, wherein the motor for turning or the motor for traveling disposed on an upper side has a through hole axially passing therethrough, and wherein the drive shaft is engaged with the motor for turning or the motor for traveling disposed on a lower side, the drive shaft being inserted into the through hole to drive the travel part or the turning table.

10. The conveyance device according to claim 9, wherein the motor for turning and the motor for traveling are disposed on a same axial line.

11. The conveyance device according to claim 9, further comprising a speed reduction mechanism decelerating rotation of the motor for turning to drive the turning table.

12. The conveyance device according to claim 11, wherein the motor for turning has an enclosure member comprising a rotor, a stator, the speed reduction mechanism, and an internal gear therein, the speed reduction mechanism being a planet gear train having the internal gear as one of components.

13. A planar conveyance apparatus comprising a plurality of the conveyance devices according to claim 1, the plurality of the conveyance devices being disposed planarly.

14. A planar conveyance apparatus comprising:
one or more main conveyance devices each composed of the conveyance device according to claim 1; and
one or more auxiliary conveyance devices each comprising:
a travel part moving an article and having a contact member, the contact member on each auxiliary conveyance device coming into contact with the article to rotate or travel; and
a turning table supporting the travel part,
wherein the travel part and/or the turning table of at least one of the auxiliary conveyance devices moves in synchronization with the travel part and/or the turning table of any of the main conveyance devices.

15. A planar conveyance apparatus comprising:
at least one main conveyance device each composed of the conveyance device according to claim 1; and
at least one auxiliary conveyance device,
wherein the one main conveyance device comprises: an engaging member connected to or engaged with the output part of the motor for turning,
wherein the one auxiliary conveyance device comprises:
a travel part moving an article and having a contact member, the contact member on the one auxiliary conveyance device coming into contact with the article to rotate or travel;
a turning table supporting the travel part on the one auxiliary conveyance device; and
a first engaging member having a through hole axially passing therethrough,
wherein the first engaging member is directly or indirectly engaged with the engaging member on the one main conveyance device to rotate with rotation of the engaging member on the one main conveyance device,
wherein the drive shaft is inserted into the through hole of the first engaging member to drive the travel part on the one main conveyance device, and
wherein the first engaging member turns the turning table and the travel part on the one main conveyance device.

16. The planar conveyance apparatus according to claim 15, wherein the at least one main conveyance device or the one auxiliary conveyance device has a first motor for traveling below the first engaging member, and
wherein the first motor for traveling rotates the drive shaft of the one main conveyance device or the one auxiliary conveyance device, and the drive shaft of another of the at least one main conveyance device or the at last one auxiliary conveyance device.

17. A planar conveyance apparatus comprising:
at least one main conveyance device each composed of the conveyance device according to claim 1; and
at least one auxiliary conveyance device,
wherein the one auxiliary conveyance device comprises:
a travel part moving an article and having a contact member, the contact member coming into contact with the article to rotate or travel;
a turning table supporting the travel part; and
a first engaging member receiving power transmission from outside to rotate,
wherein the one main conveyance device or the one auxiliary conveyance device includes a first motor for traveling,
wherein the one main conveyance device or the one auxiliary conveyance device including the first motor for traveling has a second engaging member connected to or engaged with an output part of the first motor for traveling,
wherein the one main conveyance device or the one auxiliary conveyance device not including the first motor for traveling has a third engaging member,
wherein the third engaging member is directly or indirectly engaged with the second engaging member to rotate with rotation of the second engaging member, and
wherein the third engaging member rotates the drive shaft.

18. A planar conveyance apparatus comprising:
a plurality of travel parts disposed planarly; and
a drive shaft disposed below each of the travel parts,
wherein each of the travel parts comprises:
a pair of rotators freely rotating;
an endless member suspended between the rotators; and
a driving body receiving power of the drive shaft to rotate, the driving body being engaged with the endless member between the rotators,
wherein one of the travel parts is supported by a turning table,
the turning table turnable with a respective travel part thereby causing change of conveying direction of an article on the one travel part.

19. A conveyance unit comprising:
a main conveyance device composed of the conveyance device according to claim 1; and
at least one auxiliary conveyance device,
wherein the main conveyance device, and the one auxiliary conveyance device is each defined as one conveyance cell, and three or more of the conveyance cells are planarly or linearly disposed,
wherein the main conveyance device comprises: an engaging member connected to the output part of the motor for turning,
wherein the one auxiliary conveyance device comprises:
a travel part moving an article and having a contact member, the contact member on the auxiliary conveyance device coming into contact with the article to rotate or travel;
a turning table supporting the travel part on the one auxiliary conveyance device; and
a first engaging member having a through hole axially passing therethrough,
wherein the first engaging member is directly or indirectly engaged with the engaging member on the main conveyance device to rotate with rotation of the engaging member on the main conveyance device,
wherein the drive shaft is inserted into the through hole of the first engaging member to drive the travel part on the one main conveyance device; and
wherein the first engaging member urns the turning table and the travel part on the one main conveyance device.

20. A conveyance unit comprising:
three or more conveyance cells planarly or linearly disposed;
a fifth engaging member;
a sixth engaging member;
a motor for turning; and
a motor for traveling,
wherein each of the conveyance cells comprises:
a travel part moving an article and having a contact member, the contact member coming into contact with the article to rotate or travel;
a turning table supporting the travel part; and
a drive shaft transmitting power to the travel part,
wherein two or more of the conveyance cells each have a first engaging member, wherein each of the drive shafts belonging to two or more of the conveyance cells has a third engaging member, wherein the fifth engaging member and the sixth engaging member are located at such positions not to be overlapped with each other in a height direction, wherein the fifth engaging member receive power transmission from the motor for turning to rotate whereas the sixth engaging member receives power transmission from the motor for traveling to rotate, wherein the first engaging member is directly or indirectly engaged with the fifth engaging member, allowing to rotate with rotation of the fifth engaging member to turn the turning table and the travel part, and wherein the third engaging member of each of the drive shafts is directly or indirectly engaged with the sixth engaging member, allowing to rotate with rotation of the sixth engaging member to drive the travel part, wherein one of the conveyance cells includes the motor for turning and/or the motor for traveling.

21. The conveyance unit according to claim 20, wherein the three or more conveyance cells are disposed such that a planar view shape of lines connecting centers of the three or more conveyance cells is a polygonal shape, and centers of the fifth engaging member and the sixth engaging member are located inside the polygonal shape.

22. The planar conveyance apparatus according to claim 13, wherein in a case where a plurality of objects to be conveyed are put in the planar conveyance apparatus in an overlapped state as viewed from above, the travel parts and the turning tables are driven, and the objects to be conveyed in the overlapped state are capable of being moved in such a direction as to be spread in four directions.

23. The planar conveyance apparatus according to claim 13, further comprising an information acquiring means for acquiring information from an object to be conveyed.

24. The conveyance device according to claim 1, further comprising a sensor that detects an article, wherein a detection part of the sensor is a solar cell.

25. A planar conveyance apparatus comprising a plurality of the conveyance devices according to claim 9, the plurality of the conveyance devices being disposed planarly.

26. A planar conveyance apparatus comprising:
at least one main conveyance device each composed of the conveyance device according to claim 9; and
at least one auxiliary conveyance device comprising:
a travel part moving an article and having a contact member, the contact member coming into contact with the article to rotate or travel; and
a turning table supporting the travel part of the one auxiliary conveyance device,
wherein the travel part and/or the turning table of the one auxiliary conveyance device moves in synchronization with the travel part and/or the turning table of one main conveyance device.

27. A planar conveyance apparatus comprising:
at least one main conveyance device each composed of the conveyance device according to claim 9; and
at least one auxiliary conveyance device,
wherein the one main conveyance device comprises an engaging member connected to or engaged with an output part of the motor for turning,
wherein the one auxiliary conveyance device comprises:
a travel part moving an article and having a contact member, the contact member on the one auxiliary conveyance device coming into contact with the article to rotate or travel;
a turning table supporting the travel part on the one auxiliary conveyance device; and
a first engaging member having a through hole axially passing therethrough,
wherein the first engaging member is directly or indirectly engaged with the engaging member on the one main conveyance device to rotate with rotation of the engaging member on the one main conveyance device,
wherein a drive shaft is inserted into the through hole of the first engaging member to drive the travel part on the one auxiliary conveyance device, and
wherein the first engaging member turns the turning table and the travel part on the one auxiliary conveyance device.

28. The planar conveyance apparatus according to claim 27,
wherein at least one of the one main conveyance device or the one auxiliary conveyance device has a first motor for traveling below the first engaging member, and
wherein the motor for traveling rotates the drive shaft of the one main conveyance device or the one auxiliary conveyance device, and a drive shaft of another of the at least one main conveyance device or the at least one auxiliary conveyance devices.

29. A planar conveyance apparatus comprising:
at least one main conveyance device each composed of the conveyance device according to claim 9; and
at least one auxiliary conveyance device,
wherein the one auxiliary conveyance device comprises:
a travel part moving an article and having a contact member, the contact member on the one auxiliary conveyance device coming into contact with the article to rotate or travel;
a turning table supporting the travel part on the one auxiliary conveyance device; and
a first engaging member receiving power transmission from outside to rotate,
wherein the one main conveyance device or the one auxiliary conveyance device includes a first motor for traveling,
wherein the one main conveyance device or the one auxiliary conveyance device including the first motor for traveling has a second engaging member connected to or engaged with an output part of the first motor for traveling,
wherein the one main conveyance device or the one auxiliary conveyance device not including the first motor for traveling has a third engaging member,
wherein the third engaging member is directly or indirectly engaged with the second engaging member to rotate with rotation of the second engaging member, and
wherein the third engaging member rotates one of the drive shafts.

30. A conveyance unit comprising:
a main conveyance device composed of the conveyance device according to claim 9; and
at least one auxiliary conveyance devices,
wherein the main conveyance device, and the plurality of auxiliary conveyance devices each is defined as one conveyance cell, and three or more of the conveyance cells are planarly or linearly disposed,
wherein the main conveyance device comprises an engaging member connected to an output part of the motor for turning, wherein the one auxiliary conveyance device comprises:
- a travel part moving an article and having a contact member, the contact member on the one auxiliary conveyance device coming into contact with the article to rotate or travel;
- a turning table supporting the travel part on the one auxiliary conveyance device; and
- a first engaging member having a through hole axially passing therethrough,
- wherein the first engaging member is directly or indirectly engaged with the engaging member on the main conveyance device to rotate with rotation of the engaging member on the main conveyance device,
- wherein a drive shaft is inserted into the through hole of the first engaging member to drive the travel part on the one auxiliary conveyance device, and
- wherein the first engaging member turns the turning table and the travel part on the one auxiliary conveyance device.

31. The planar conveyance apparatus according to claim 25, wherein in a case where a plurality of objects to be conveyed are put in the planar conveyance apparatus in an overlapped state as viewed from above, the travel parts and the turning tables are driven, and the objects to be conveyed in the overlapped state are capable of being moved in such a direction as to be spread in four directions.

32. The planar conveyance apparatus according to claim 25, further comprising an information acquiring means for acquiring information from an object to be conveyed.

33. The conveyance device according to claim 9, further comprising a sensor that detects an article, wherein a detection part of the sensor is a solar cell.

* * * * *

UNITED STATES PATENT AND TRADEMARK OFFICE
CERTIFICATE OF CORRECTION

PATENT NO. : 10,577,189 B2
APPLICATION NO. : 15/573538
DATED : March 3, 2020
INVENTOR(S) : Kazuo Itoh, Tatsuhiko Nakamura and Kazuwo Miki It is certified that error appears in the above-identified patent and that said Letters Patent is hereby corrected as shown below:

In the Claims

Column 27, Lines 40-48, should read, (approx.):
16. The planar conveyance apparatus according to claim 15, wherein the one main conveyance device or the one auxiliary conveyance device has a first motor for traveling below the first engaging member, and
    wherein the first motor for traveling rotates the drive shaft of the one main conveyance device or the one auxiliary conveyance device, and the drive shaft of another of the at least one main conveyance device or the at least one auxiliary conveyance device.

Column 28, Lines 24-52, should read, (approx.):
19. A conveyance unit comprising:
    a main conveyance device composed of the conveyance device according to claim 1; and
    at least one auxiliary conveyance device,
wherein the main conveyance device, and the one auxiliary conveyance device is each defined as one conveyance cell, and three or more of the conveyance cells are planarly or linearly disposed,
wherein the main conveyance device comprises: an engaging member connected to the output part of the motor for turning,
wherein the one auxiliary conveyance device comprises:
    a travel part moving an article and having a contact member, the contact member on the auxiliary conveyance device coming into contact with the article to rotate or travel;
    a turning table supporting the travel part on the one auxiliary conveyance device; and
    a first engaging member having a through hole axially passing therethrough,
wherein the first engaging member is directly or indirectly engaged with the engaging member on the main conveyance device to rotate with rotation of the engaging member on the main conveyance device,
wherein the drive shaft is inserted into the through hole of the first engaging member to drive the Signed and Sealed this
Seventh Day of April, 2020

Andrei Iancu
*Director of the United States Patent and Trademark Office*

CERTIFICATE OF CORRECTION (continued)
U.S. Pat. No. 10,577,189 B2 travel part on the one main conveyance device; and
wherein the first engaging member turns the turning table and the travel part on the one main conveyance device.